(12) United States Patent
Srikanth et al.

(10) Patent No.: US 10,491,662 B2
(45) Date of Patent: Nov. 26, 2019

(54) DYNAMICALLY ORGANIZING CLOUD COMPUTING RESOURCES TO FACILITATE DISCOVERY

(75) Inventors: Munirathnam Srikanth, Bellevue, WA (US); Sundar Kannan, Bellevue, WA (US); Kevin Dougan, Waterloo (CA); Steve Jamieson, Bellevue, WA (US); Sriram Subramanian, Bothell, WA (US)

(73) Assignee: COMPUTENEXT, INC., Bellevue, WA (US)

( * ) Notice: Subject to any disclaimer, the term of this patent is extended or adjusted under 35 U.S.C. 154(b) by 808 days.

(21) Appl. No.: 13/348,533

(22) Filed: Jan. 11, 2012

(65) Prior Publication Data
US 2012/0198073 A1 Aug. 2, 2012

Related U.S. Application Data

(60) Provisional application No. 61/436,905, filed on Jan. 27, 2011.

(51) Int. Cl.
*G06F 15/173* (2006.01)
*H04L 29/08* (2006.01)
(Continued)

(52) U.S. Cl.
CPC ............ *H04L 67/10* (2013.01); *G06F 9/5027* (2013.01); *G06F 9/5072* (2013.01); *G06F 16/958* (2019.01); *H04W 4/60* (2018.02)

(58) Field of Classification Search
CPC ..... H04L 47/70; H04L 43/04; H04L 67/1097; G06Q 10/0633; G06F 17/2785; H04N 21/00; G06N 99/005; G06N 5/00
(Continued)

(56) References Cited

U.S. PATENT DOCUMENTS

2007/0094256 A1* 4/2007 Hite .................... G06F 17/2785
2008/0082782 A1* 4/2008 Meijer et al. ................. 711/207
(Continued)

FOREIGN PATENT DOCUMENTS

| CN | 101454747 A | 6/2009 |
| CN | 101593182 A | 12/2009 |

OTHER PUBLICATIONS

Bernstein, D.; Vij, D., "Intercloud Directory and Exchange Protocol Detail Using XMPP and RDF," Services (SERVICES-1), 2010 6th World Congress on , vol., no., pp. 431,438, Jul. 5-10, 2010.*
(Continued)

*Primary Examiner* — Taylor A Elfervig
(74) *Attorney, Agent, or Firm* — Christensen O'Connor Johnson Kindness PLLC

(57) ABSTRACT

Pieces of hardware on which pieces of software are executed are configured to organize computing resources from different computing resource providers so as to facilitate their discovery. A catalog, which stores instances of cloud computing resources and their providers, and a knowledge base, which stores types of computing resources including rules which reveal their discovery, are formed by the software. A curating method is performed to enable semantic search including searching for cloud computing resources that in combination cooperate to satisfy a workload or a task in addition to having a simple computational function. Semantic indexing is performed to facilitate the semantic search.

20 Claims, 22 Drawing Sheets

(51) Int. Cl.
    *G06F 9/50*        (2006.01)
    *G06F 16/958*      (2019.01)
    *H04W 4/60*        (2018.01)
(58) Field of Classification Search
    USPC ........... 709/217, 226; 725/87, 101; 718/104, 718/106
    See application file for complete search history.

(56) References Cited

U.S. PATENT DOCUMENTS

| | | |
|---|---|---|
| 2010/0042720 A1 | 2/2010 | Stienhans |
| 2010/0125669 A1* | 5/2010 | Esfahany .............. G06F 9/5072 709/228 |
| 2010/0306767 A1 | 12/2010 | Dehaan |
| 2011/0126275 A1* | 5/2011 | Anderson et al. ................ 726/8 |
| 2012/0158821 A1* | 6/2012 | Barros .................. G06F 9/5055 709/203 |

OTHER PUBLICATIONS

L. Moreau, S. Miles, J. Papay, K. Decker, T. Payne, "Publishing Semantic Descriptions of Services", Semantic Grid Workshop at GGF9, 2005.*

Atuchukwu, Charles, "Web-based Instant Messaging", 2009, p. 1-6, thesis, http://www.cs.uwc.ac.za/~acharles/documentation1.pdf (Year: 2009).*

Takeshi Takahashi, Youki Kadobayashi, and Hiroyuki Fujiwara. 2010. Ontological approach toward cybersecurity in cloud computing. In Proceedings of the 3rd international conference on Security of information and networks (SIN '10). ACM, New York, NY, USA, 100-109 (Year: 2010).*

L. Youseff, M. Butrico and D. Da Silva, "Toward a Unified Ontology of Cloud Computing," 2008 Grid Computing Environments Workshop, Austin, TX, 2008, pp. 1-10. (Year: 2008).*

International Search Report and Written Opinion dated Jul. 30, 2012, issued in corresponding International Application No. PCT/US2012/020975, filed Jan. 11, 2012, 7 pages.

Amarnath, B.R.., et al., "Ontology-Based Grid Resource Management," Software—Practice and Experience 39(17):1419-1438, Dec. 2009.

Bernstein, D., and D. Vij, "Intercloud Directory and Exchange Protocol Detail Using XMPP and RDF," IEEE 6th World Congress on Services, Jul. 5, 2010, Piscataway, New Jersey, pp. 431-438.

Goscinski, A., and M. Brock, "Toward Dynamic and Attribute Based Publication, Discovery and Selection for Cloud Computing," Future Generation Computer Systems 26(7):947-970, Jul. 2010.

Extended European Search Report dated Jul. 8, 2014, issued in corresponding European Application No. EP 12739477.3, filed Jan. 12, 2012, 6 pages.

Second Office Action dated Mar. 24, 2017, issued in corresponding Chinese Application No. 201280015895.5, filed Jan. 11, 2012, 11 pages.

Bernstein, D., and D. Vij, "Intercloud Directory and Exchange Protocol Detail Using XMPP and RDF," Proceedings of the 6th World Congress on Services, Miami, Jul. 5-10, 2010, IEEE Computer Society, pp. 431-438.

First Office Action, dated May 31, 2016, issued in corresponding Chinese Application No. 201280015895.5, filed Jan. 11, 2012, 13 pages.

* cited by examiner

DYNAMICALLY ORGANIZING CLOUD COMPUTING RESOURCES TO FACILITATE DISCOVERY

CROSS-REFERENCE TO RELATED APPLICATION

The application claims the benefit of Provisional Application No. 61/436,905, filed Jan. 27, 2011, which is incorporated herein by reference.

TECHNICAL FIELD

The present subject matter generally relates to software, and more particularly, it relates to cloud computing.

BACKGROUND

Modernity requires computing resources to perform varying computational functions whenever and wherever there are computational requirements. Software developers and enterprises are increasingly using on-demand computing environments couched as cloud computing to satisfy such computational demands. Because different computational functions require different computing resources whose availability is dependent on location, time, or both, as well as others, identifying them can be difficult especially when computational requirements cannot be satisfied by a pre-selected computing resource provider or a set of computing resource providers.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One aspect of the subject matter includes a method form in which a method for organizing cloud computing resources so as to discover them is recited. The method creates a catalog of different computing resource providers and their computing resources that are available on-demand over the Internet. The method also creates a knowledge base of types of computing resources storing semantic descriptors of the types, their attributes including relations among computing resources, taxonomy of their values, and actions that are configured to be performed based on the types and the capabilities of the computing resource providers of the computing resources. The method further dynamically updates the catalog and the knowledge base to refresh pieces of information pertaining to the different computing resource providers, semantic descriptors of computing resources, types, their attributes, and the taxonomy of their values so as to inventory computing resources that are available on-demand over the Internet.

Another aspect of the subject matter includes a system form in which a system for organizing cloud computing resources so as to discover them is recited. The system comprises resource cataloging hardware on which a catalog of different computing resource providers and their computing resources is stored. The system also comprises a knowledge base of types of computing resources storing semantic descriptors of the types, their attributes including relations among computing resources, taxonomy of their values, and actions that are configured to be performed based on the types and the capabilities of the computing resource providers of the computing resources. The system further comprises user tools and backend hardware configured to dynamically update the catalog and the knowledge base to refresh pieces of information pertaining to the different computing resource providers, semantic descriptors of computing resources, types, their attributes, and the taxonomy of their values so as to inventory computing resources that are available on-demand over the Internet.

A further aspect of the present subject matter includes a computer-readable medium form which recites a computer-readable medium on which computer-executable instructions are stored to implement a method for organizing cloud computing resources so as to discover them. The method comprises creating a catalog of different computing resource providers and their computing resources that are available on-demand over the Internet. The method additionally comprises creating a knowledge base of types of computing resources storing semantic descriptors of the types, their attributes including relations among computing resources, taxonomy of their values, and actions that are configured to be performed based on the types and the capabilities of the computing resource providers of the computing resources. The method further comprises dynamically updating the catalog and the knowledge base to refresh pieces of information pertaining to the different computing resource providers, semantic descriptors of computing resources, types, their attributes, and the taxonomy of their values so as to inventory computing resources that are available on-demand over the Internet.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
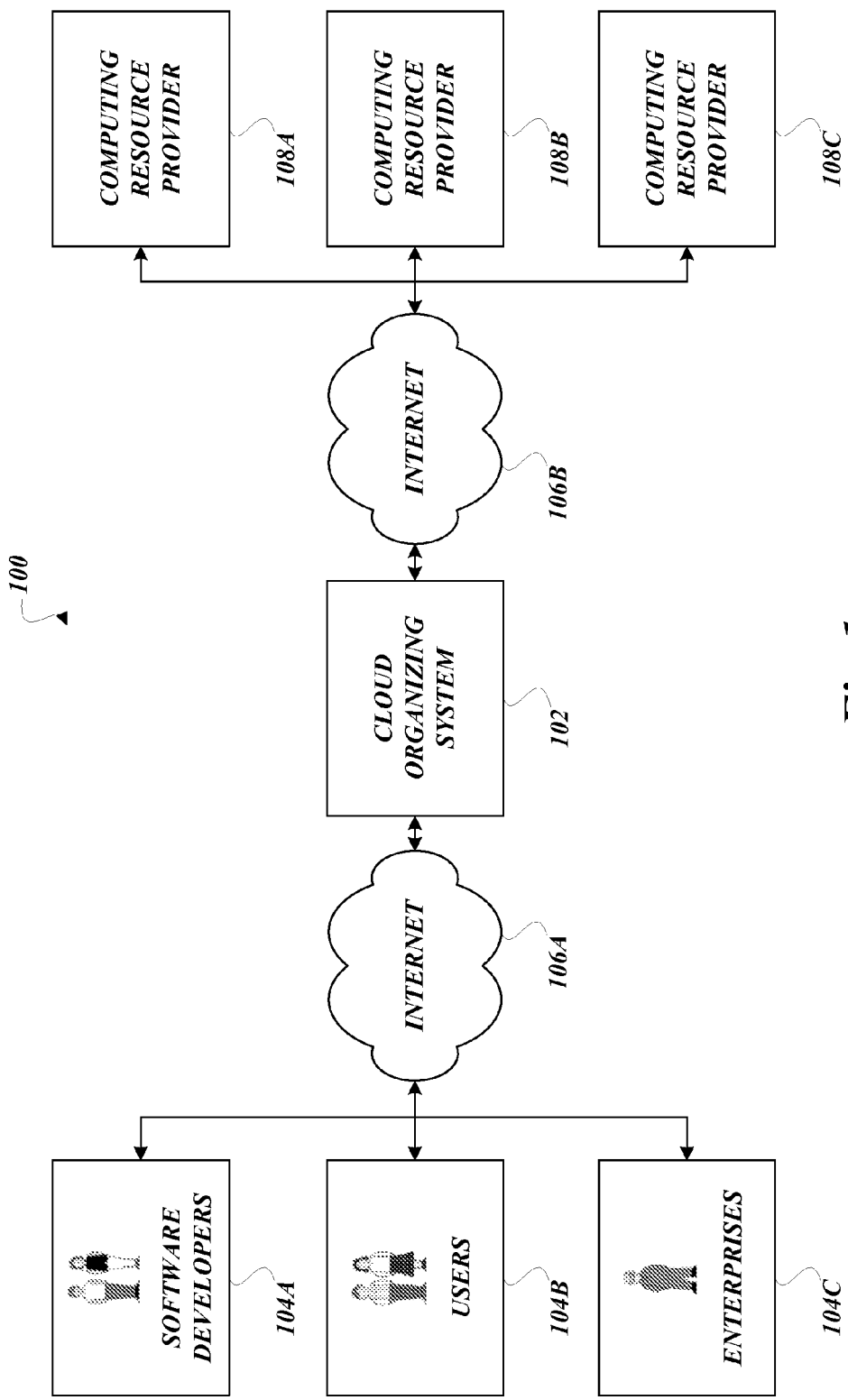
FIG. 1 is a block diagram illustrating various pieces of archetypical system configured to service on-demand computing queries via computing resources in accordance with various embodiments of the present subject matter.

FIG. 1 illustrates pieces of hardware on which pieces of software are executed to implement a system 100 for organizing computing resources vis-à-vis computing resources in on-demand computing environments so as to facilitate software developers 104a, users 104b, and enterprises 104c, as well as others, to find and obtain one or more computational offers, and select a computational offer comprising one computing resource or a combination of computing resources that perform required computational functions, tasks, or workloads, which may be defined at different levels of granularity. Software developers 104a, users 104b, and enterprises 104c may present queries to cloud organizing system 102 via a network, such as the Internet 106a, 106b.

The cloud organizing system 102 organizes computing resources of various computing resource providers 108a-108c, so as to assist in the finding and presentation of computational offers. The term system means the inclusion of commercial computing hardware, which can be dedicated on or in the cloud, and software applications running the various pieces of software, such as those that organize computing resources.

The system 100 thus is directed to cloud computing, which in various embodiments, the system 100 captures, represents, understands, and enables the usage of computing resources as well as usage of data obtained from observations of usage of computing resources, in federated on-demand computing environments. In another embodiment, the system 100 facilitates commercial computing resource exchange and rental between computing resource consumers and computing resource providers. In other embodiments, the system 100 facilitates computing resource utilization mechanisms, such as Infrastructure-as-a-Service (IaaS), Platform-as-a-Service (PaaS), Software-as-a-Service (SaaS) and Database-as-a-Service (DaaS).

Various embodiments of the present subject matter provide hardware/software mechanisms to automatically find these computing resource providers and their offerings; hardware/software mechanisms to dynamically select, allocate, and use resources across different providers to perform a workload or task; and hardware/software capabilities to selectively de-allocate utilized resources based on task performance and usage. Various embodiments of the present subject matter ease the finding of the increasing list of on-demand computing resource providers, and the capturing of different types of computing resources with their descriptions and metadata including prices that may vary over time. Additionally, usage data taken from observations of the usage of computing resources is made available, by various embodiments, for computing resource providers to appreciate their customers and the needs of their customers in terms of desired computing resources so as to better model their configurations and setups.

Various embodiments of the present subject matter appreciate the dynamic nature of computing requirements of software developers and enterprises. Using various embodiments, hosting computing resource providers can provide contract-based, planned allocation of computing resources to transactions, as well as on demand procurement and provisioning of computing resources. In this context, for example, computing resources can be defined by the specification of, among other attributes, processing speed, memory, storage and operating system features of physical or virtual machines, as well as including relations among computing resources. On-demand computing requires that data centers may use various embodiments to provision computing resources through web services and bill on a transaction basis. Using various embodiments, users are no longer restricted by the type of resources available in public data centers and computing resource providers. Users have capability and choice in locating the most appropriate computing resources for their computing needs. Various embodiments facilitate the discovery of the existence of, and subsequently procure and use resources from, other computing resource providers that may have resources appropriate for the task at hand. A few embodiments provide mechanisms for users and their automated software agents to query a computing resource catalog or knowledge base to match the needs of their workloads with different types of computing resources, possibly from different computing resource providers that are appropriate for the required workloads.

In some embodiments of the present subject matter, methods and mechanisms are available to facilitate discovery and matching of computing resources that not only enable computing resource providers to find avenues to publish their computing resources in a catalog but also enable computing resource consumers to discover and utilize appropriately matched computing resources. Various embodiments facilitate the monitoring and management of resource utilization in the federated on-demand computing environment of the system 100, thereby providing access to appropriate computing resources for consumers and metrics for predictable capacity planning and management of data centers for computing resource providers.

Figure 2:
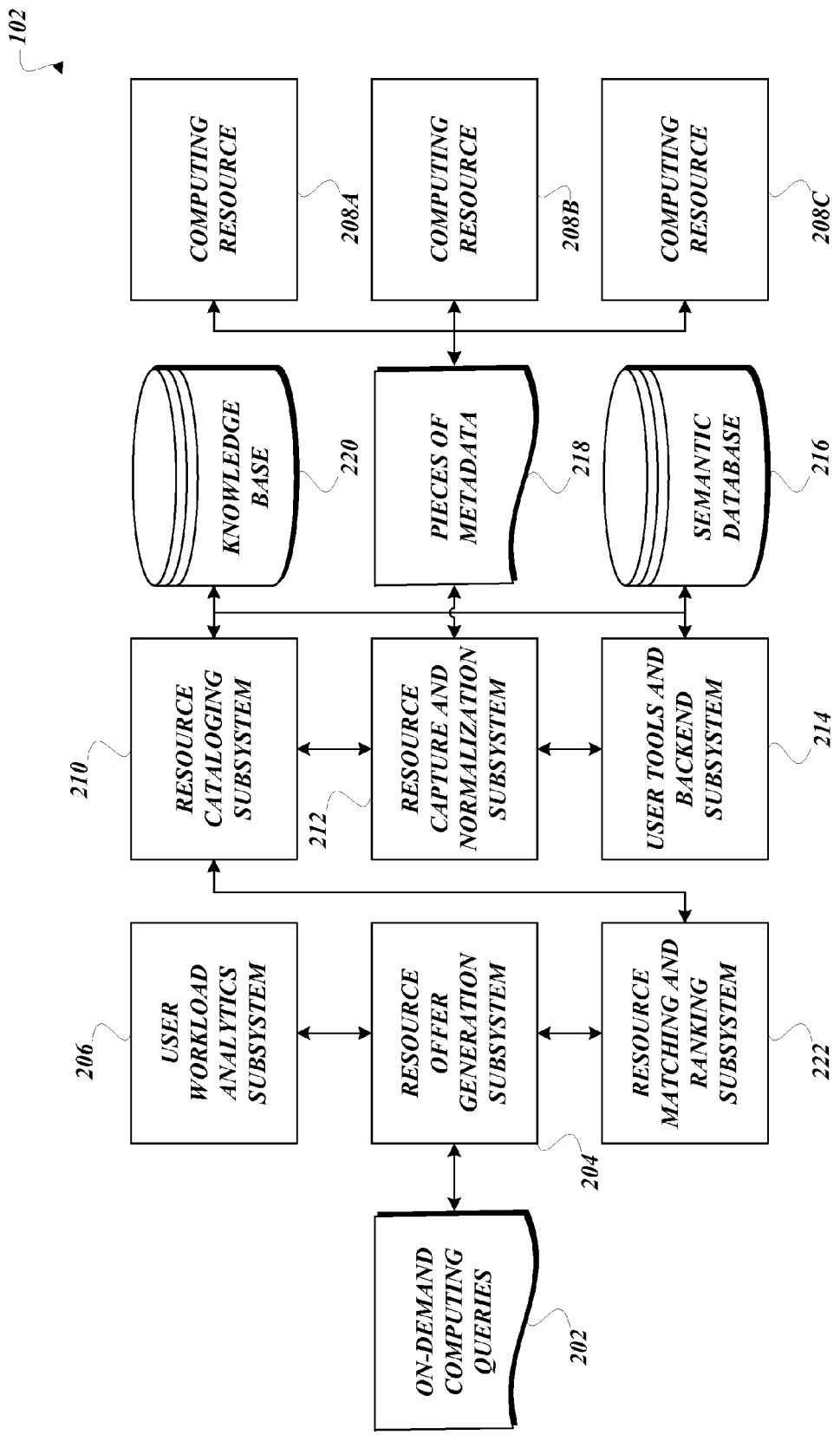
FIG. 2 is a block diagram illustrating various pieces of archetypical networked subsystems configured to organize computing resources in accordance with various embodiments of the present subject matter.

FIG. 2 illustrates pieces of the cloud organizing system 102. Generally, these pieces of cloud organizing system 102 execute pieces of software that are configured to provide various computational services: cataloging (through a catalog) of computing resources that are dynamically updated and/or refreshed so as to capture past, present, and future computing resources; learning to capture and/or normalize descriptions and attributes of computing resources from different computing resource providers (including relations among computing resources from the same computing resource provider or different computing resource providers); learning to capture and/or understanding functions, tasks, or workloads tendered (or queried) by software developers 104a, users 104b, and enterprises 104c; learning to match and/or rank to generate computational offers responsive to queries; sets of tools assisting software developers 104a, users 104b, and enterprises 104c to query; and a backend system. In some embodiments, a set of application programming interfaces that allow cooperation among these functions is provided to allow software agents to expand the computational services of the cloud organizing system 102.

More specifically, various embodiments crawl or receive voluntary information from experts or computing resource providers regarding computing resources that are managed in a computing resource catalog. Different metadata, as part of the crawled or received information, include specifications, licenses, price, location, and availability. The metadata that are captured are used for classifying and organizing the catalog. As mentioned, such metadata can be provided directly by the computing resource providers or can be crawled from variety of sources including but not limited to web pages, published APIs, and cloud platforms. The veracity of the catalog along with the latest information on inventory and availability is maintained using methods and models for dynamic monitoring and updates of cloud platforms and computing resource providers in accordance with various embodiments. Learned models enable the mapping and normalization of metadata derived from sources in the catalog. In addition to the normalized view of computing resources, different classifications of the catalog facilitate the discovery of new resource types and matching of user computing resource requirements to computational offers. Unlike conventional on-demand computing environments, which enable users to select from a pre-defined list of resources and use them, various embodiments present suitable offers of computing resources and their combinations which are not necessarily pre-defined. In addition, learning models, in accordance with various embodiments, facilitate capturing and understanding user tasks and workloads, resulting in the suitable representation of user requirements at a higher level (instead of as merely single resource queries), which enables procurement, monitoring, and accomplishing required tasks (although single queries are also supported by various embodiments). The catalog of computing resources represents offerings of resource providers, their metadata, and inferred categories and knowledge of the computing resources, including usage information, realized through the finding and the utilization of these computing resources for particular user tasks and workloads, and information and knowledge derived and maintained about these computing resources and their computing resource providers. Different learning models are provided by various embodiments including those that identify, normalize, and organize computing resources, and facilitate their discovery and use so as to contribute to the management of the life cycle of the computing resource catalog.

On-demand computing queries 202 coming from various sources, such as software developers 104a, users 104b, and enterprises 104c, are presented to the cloud organizing system 102. Computing resources 208a-208c of various computing resource providers 108a-108c yield pieces of metadata, among other pieces of information, which are gathered by various pieces of software executing on pieces of cloud organizing system 102. After these pieces of information are gathered, a resource capture and normalization subsystem 212 executes suitable pieces of software on them. Resource cataloging subsystem 210 stores away classified computing resources 208a-208c that are connected with computing resource providers 108a-108c. User tools and backend subsystem 214 work together with a semantic database 216 to produce a knowledge base 220 that stores rules and metrics for allowing queries to be performed. Responsive to the on-demand computing queries 202, resource matching and ranking subsystem 222 searches a catalog maintained by the resource cataloging subsystem 210 to discover computing resources 208a-208c that satisfy the on-demand computing queries 202.

The user tools and backend subsystem 214 cooperates with the semantic database 216 that curates the knowledge base of computing resources along with the catalog of computing resources. A graph-based representation is envisaged that enables efficient indexing and enrichments of the resources, their descriptions, and templates over time. Different sources provide information about the resources and their providers, and represent them in the catalog. The veracity of the catalog and the freshness of its contents, especially the inventory information, are maintained by the user tools and backend subsystem 214. Resource capture, curation, and access capabilities of computing resource catalog, resource knowledge base, and search and provisioning solutions are exposed as application programming interfaces (APIs) that can be accessed through different mechanisms. User tools facilitate the capture, annotation, validation, and enrichment of the catalog and knowledge base for the purpose of managing the lifecycle of the computing resource catalog. User tools include user interfaces to expose search capability as well as present augmented information about resources, workloads, and tasks.

The catalog refers to a catalog of computing resources storable on a computer-readable medium in a form of computer-executable or computer-accessible instructions and data, which is indexed to enable search and discovery of computing resources. An abstraction of the catalog is the knowledge base 220 which stores semantic representations of the computing resource types, their attributes, taxonomy of their values, and other categorical information about the computing resources, such as actions that are configured to be performed based on the types and the capabilities of the computing resource providers of the computing resources. The knowledge base 220 may be used to refer to the catalog, the knowledge base, or both as suitable. The catalog typically holds particular computing resource (instance) information while the knowledge base maintains the information to interpret the same, such as concepts, interpretations, and rules that govern the instances of computing resources. Additionally, the use of the catalog in the singular does not limit it to the singular because there can be multiple catalogs, each being maintained to provide different federation services, and all can be commanded to yield computational offers across time and geographic boundaries.

To recap, on-demand (cloud) computing environments, both public and private, proffer a fixed set of resource types available from a computing resource provider, and applications have to be customized to use computing resources from every additional resource provider. In contrast, various embodiments include methods for discovering computing resources, which vary, and their descriptions from different computing resource providers and mechanisms for publishing and accessing a dynamic inventory of resource types available from different types of resource providers. Current on-demand computing environments are exposed as web services or through web pages for users to access these resources. Consumers of these computing resources use manual methods to discover one or more of these computing resource providers. Various embodiments, in contrast, provide automated methods to facilitate discovery of these computing resources, their providers, and their computing environments. The computing resource catalog of various embodiments enables the consumers to consult its search services to find/discover appropriate computing resources, select, and utilize such resources through computation offers. One or more computational offers are generated by the resource offer generation subsystem 204 to an entity that originates the on-demand computing queries 202, such as software developers 104a, users 104b, or enterprises 104c. User workload analytics subsystem 206 observes the queries, and responses to queries for refining pieces of software executing on the cloud organizing system 102.

Figure 3A:
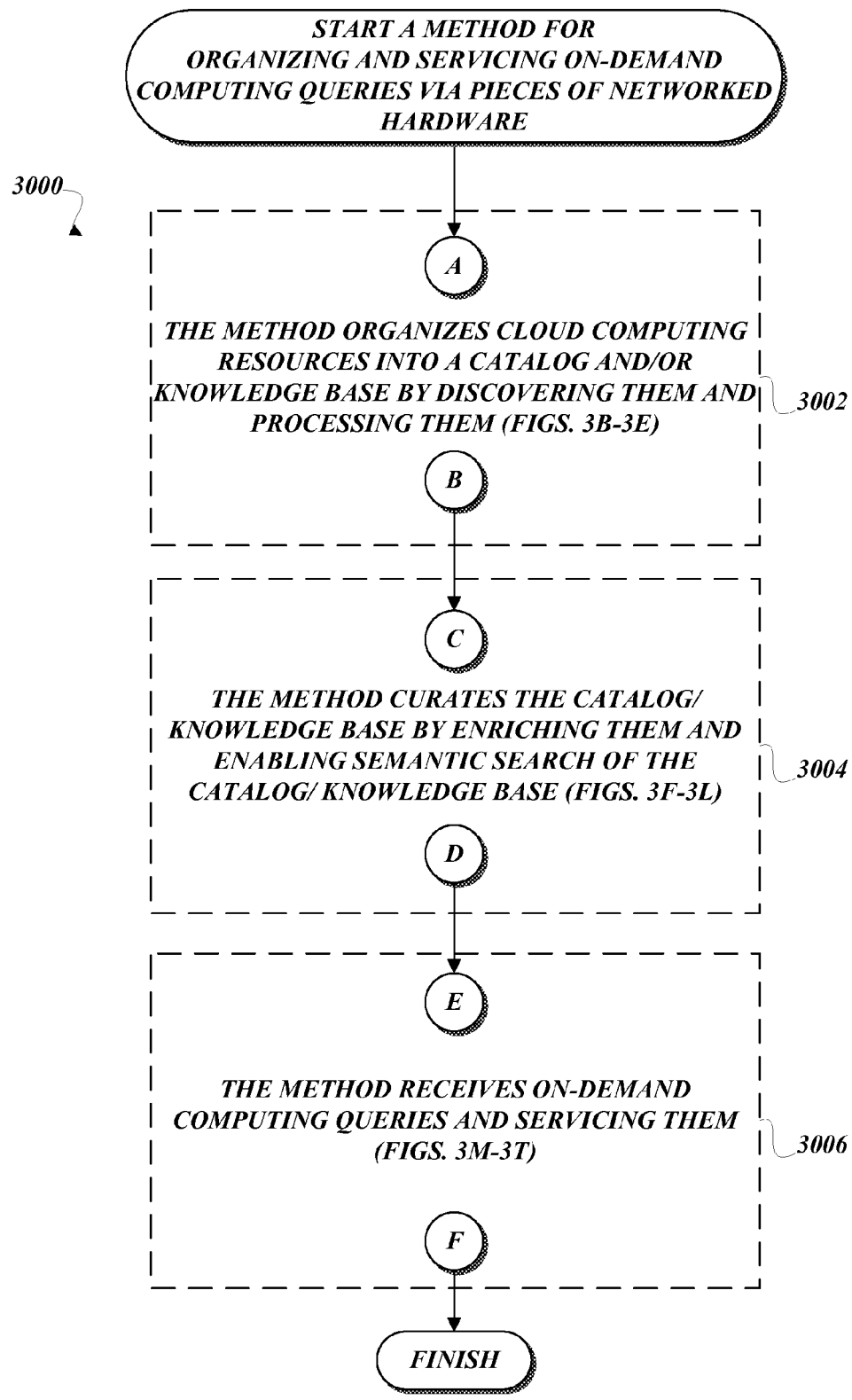
FIGS. 3A-3T are process diagrams illustrating an archetypical software method for organizing and servicing on-demand computing queries via pieces of networked hardware in accordance with various embodiments of the present subject matter.
Figure 3B:
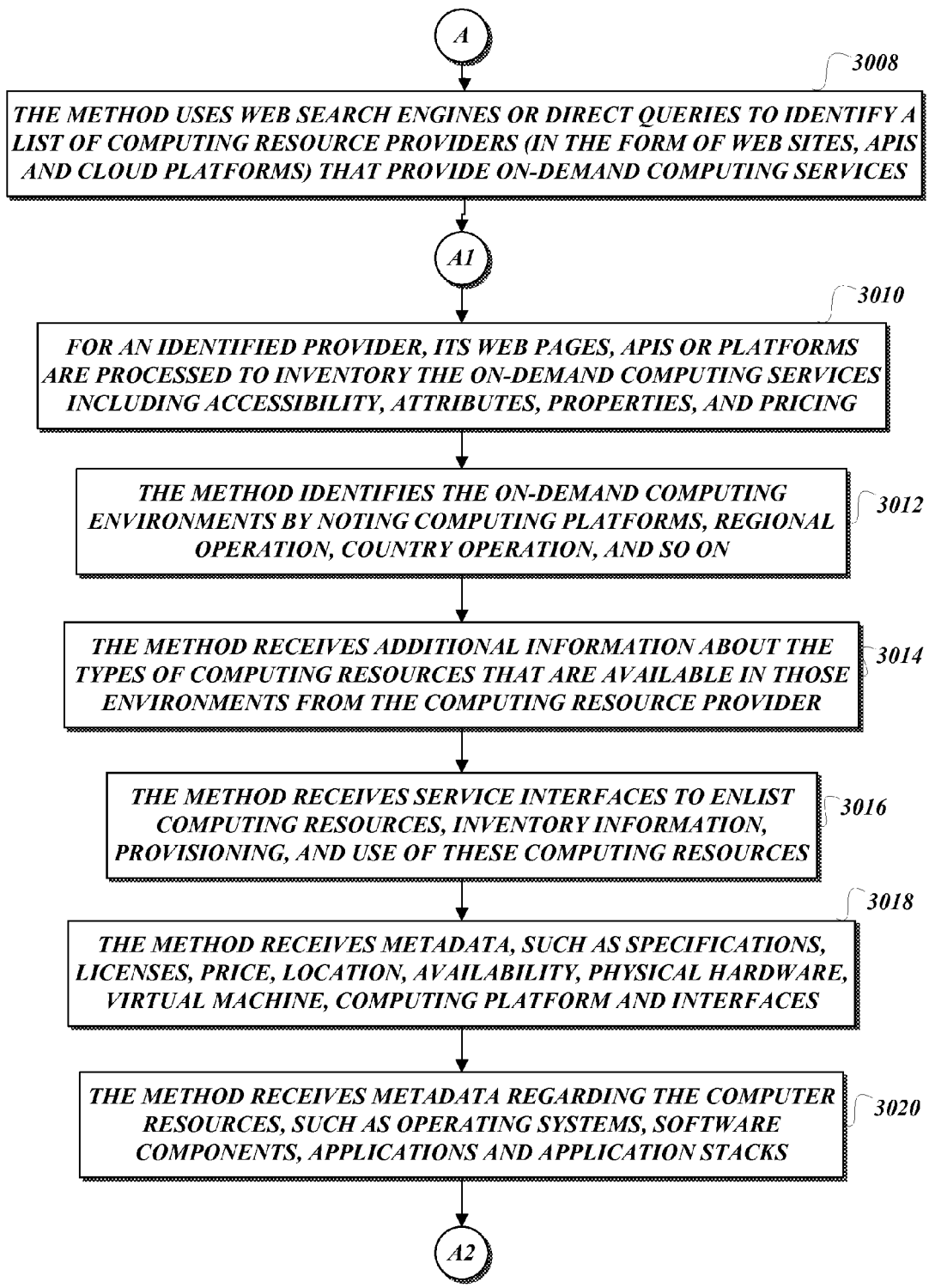
Figure 3C:
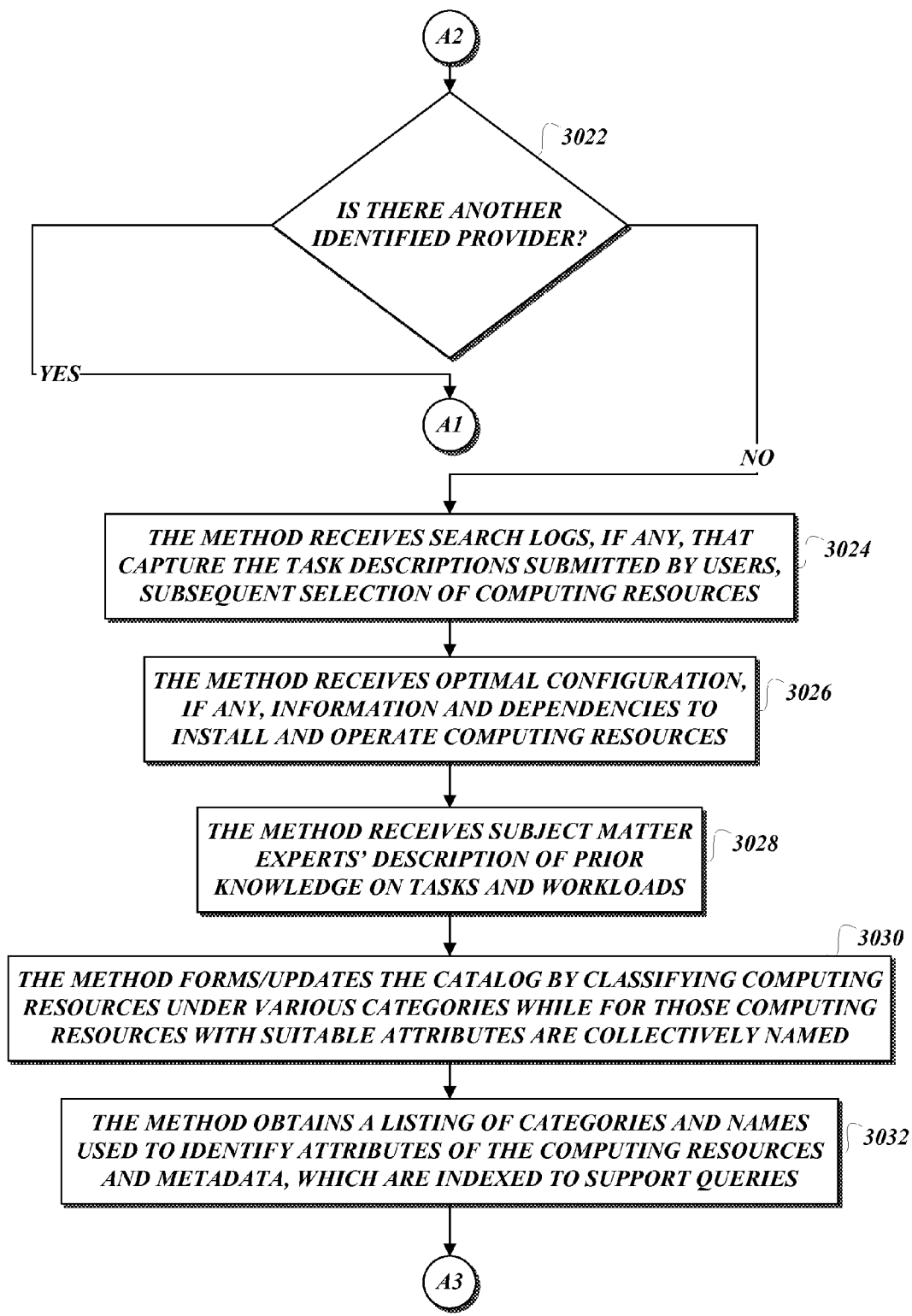
Figure 3D:
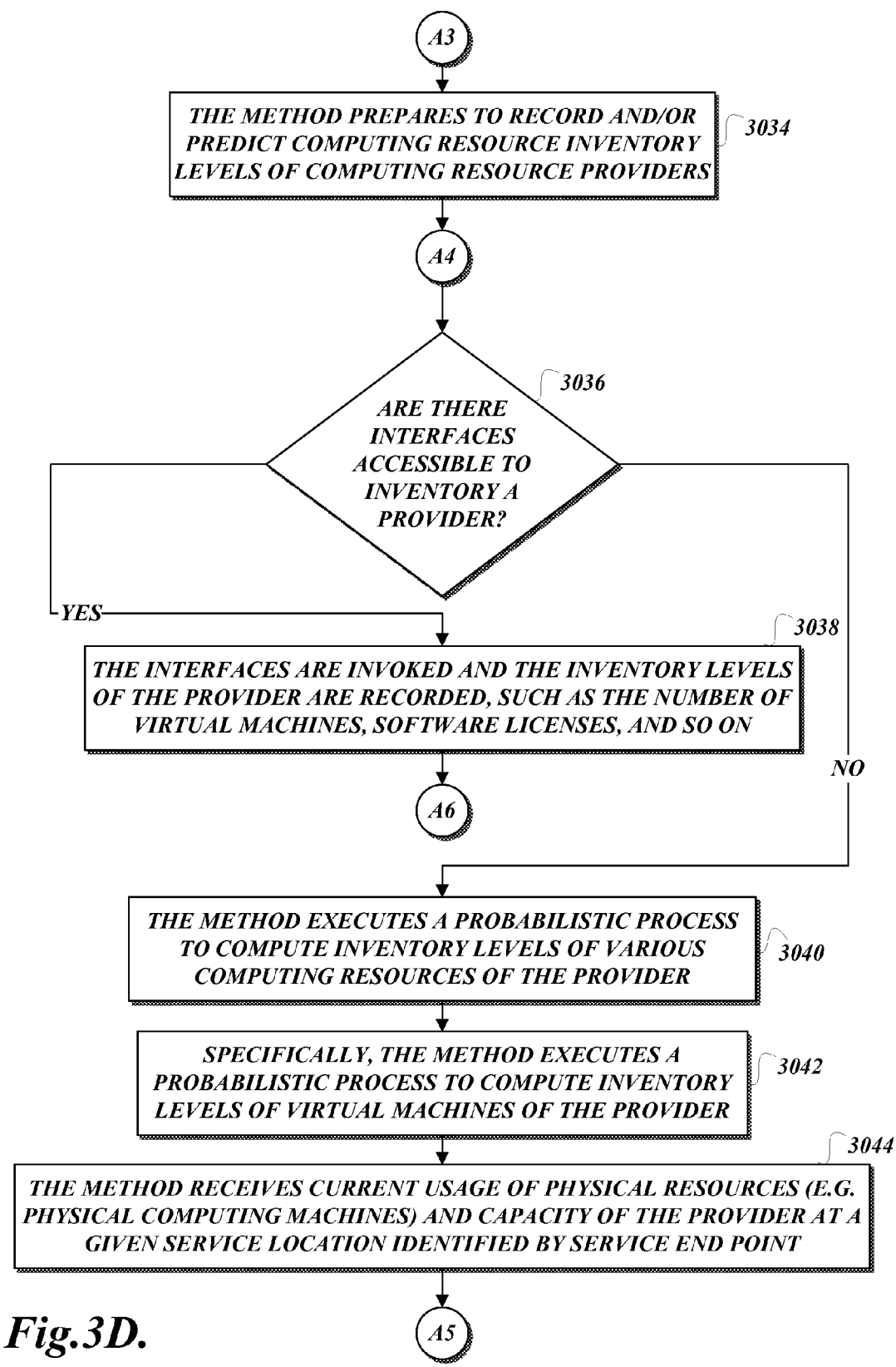
Figure 3E:
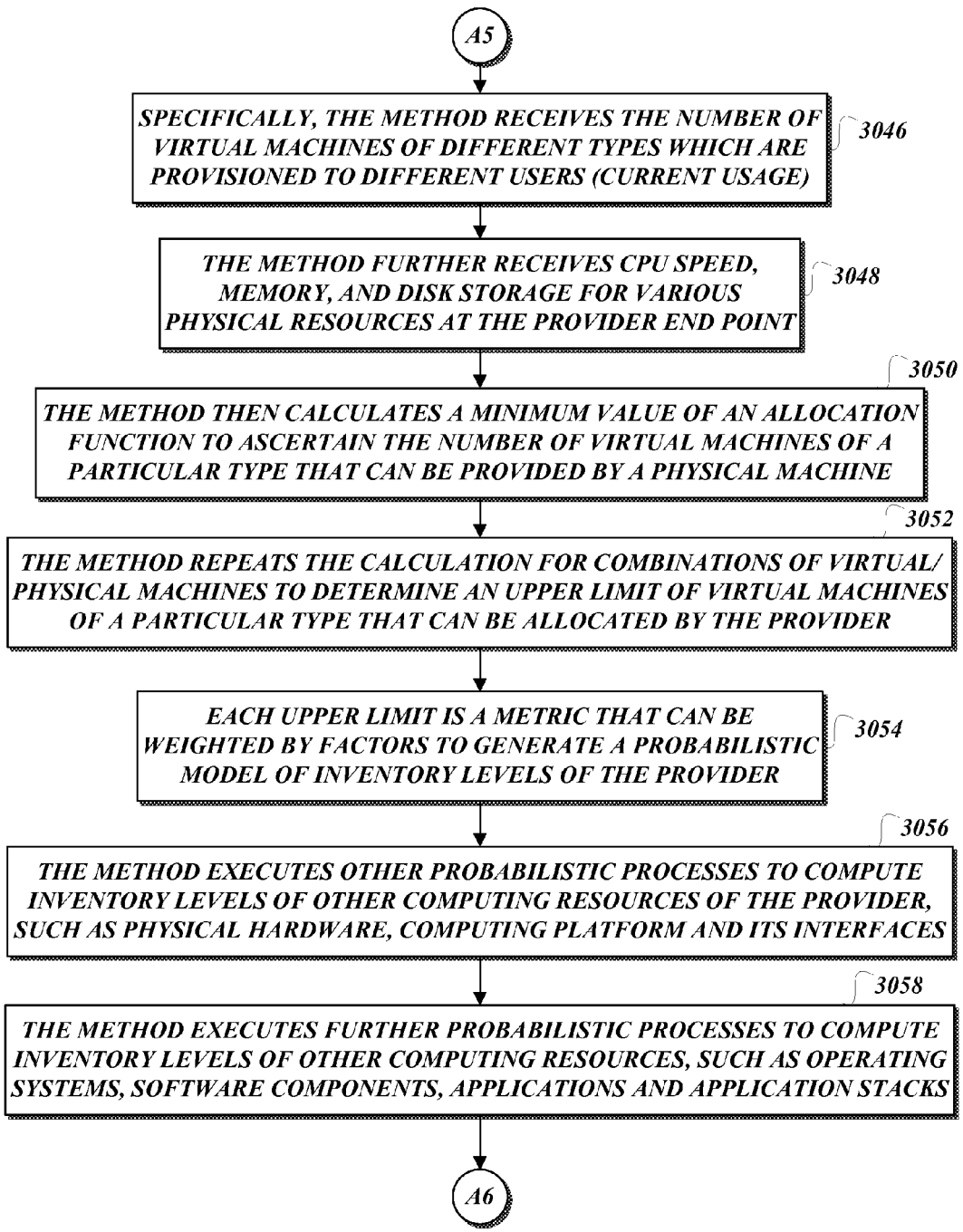
Figure 3F:
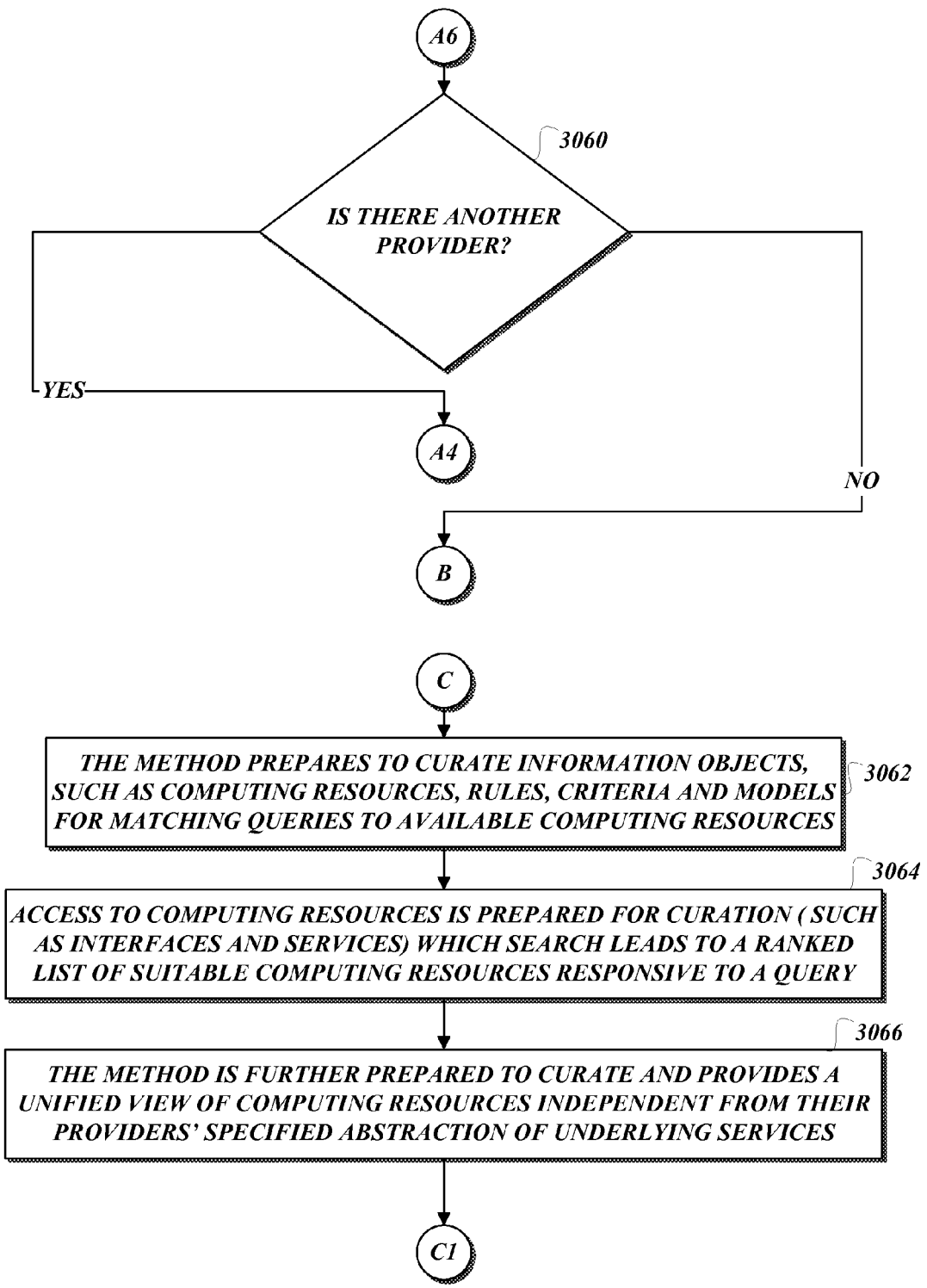
Figure 3G:
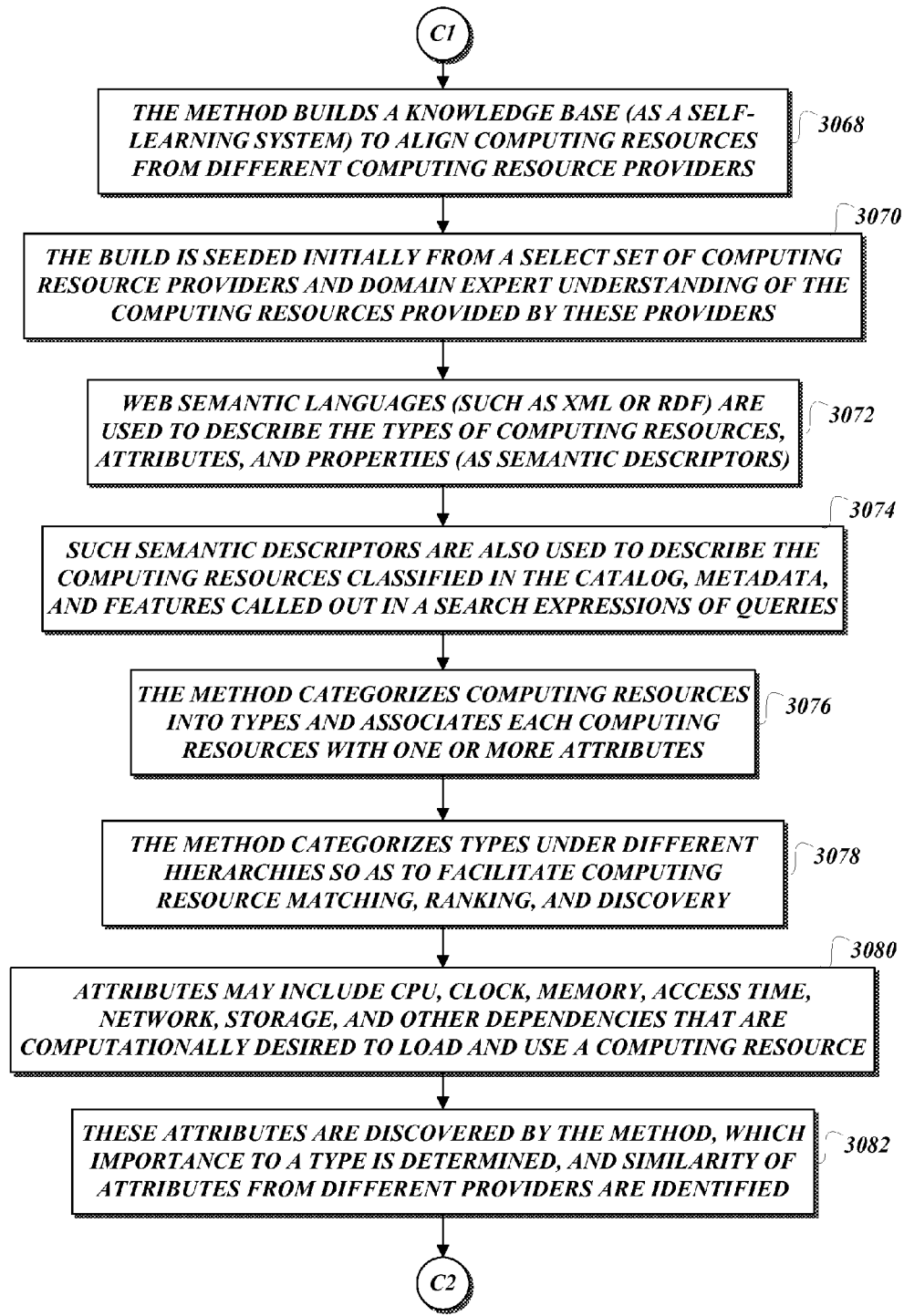
Figure 3H:
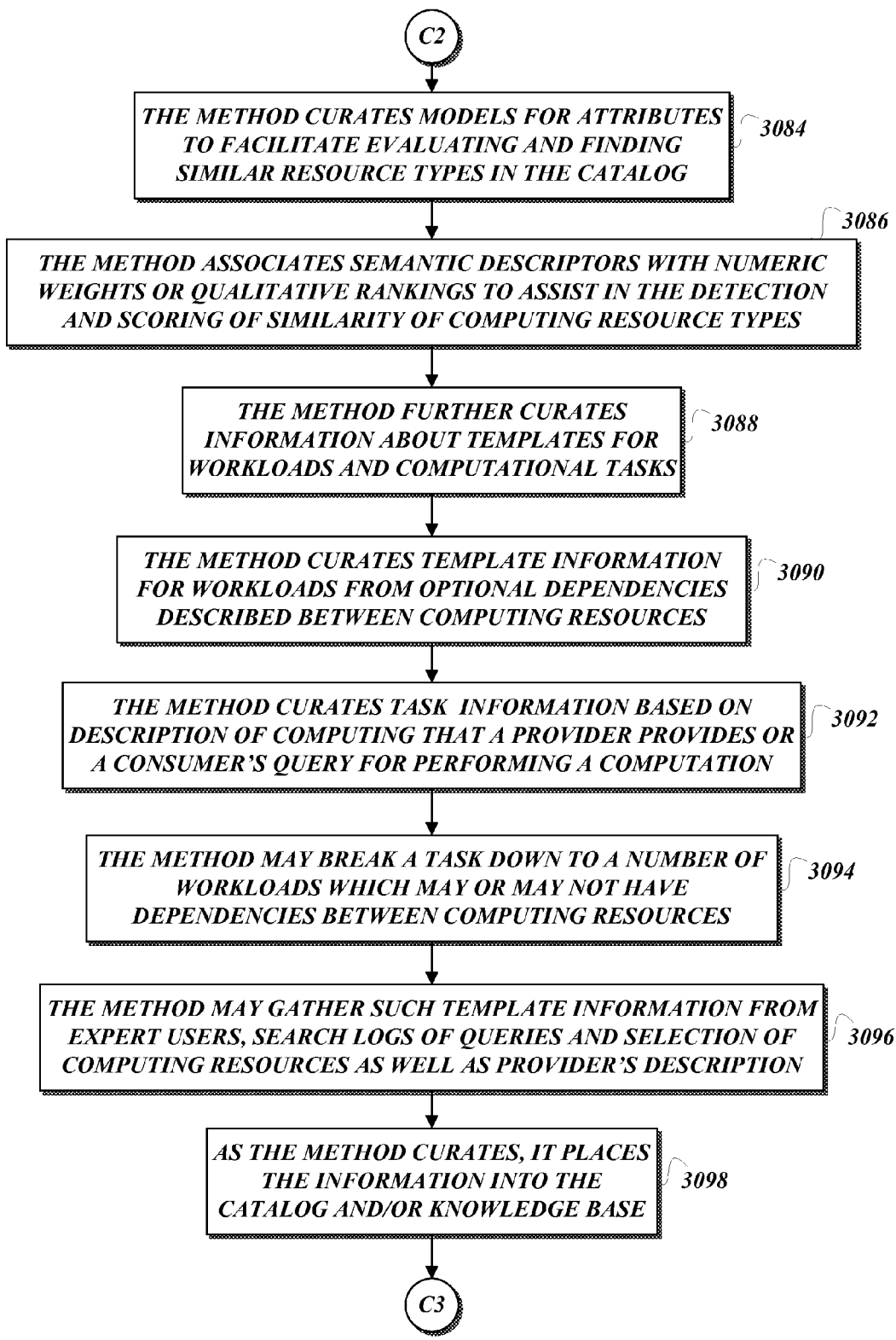
Figure 3I:
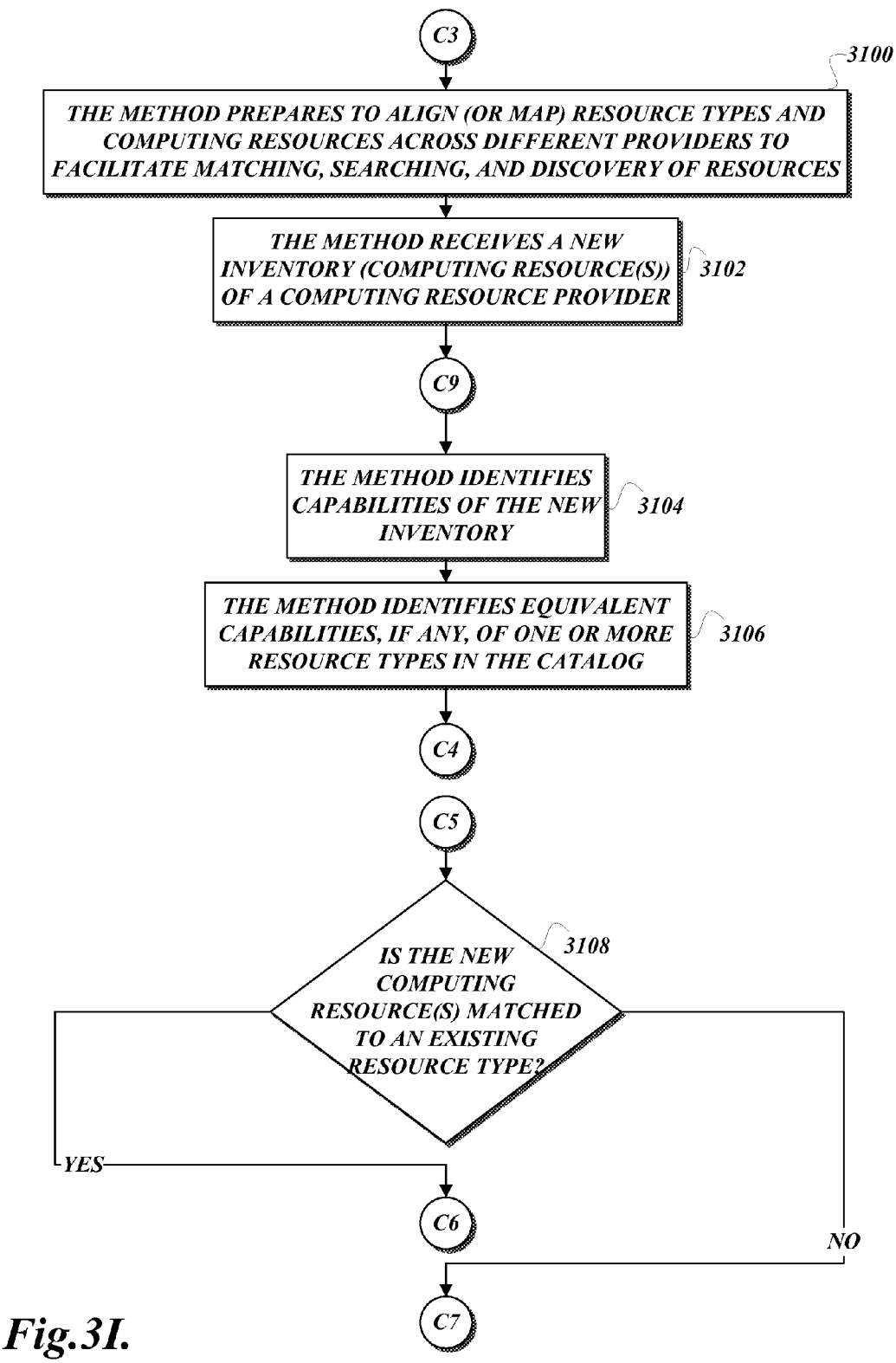
Figure 3J:
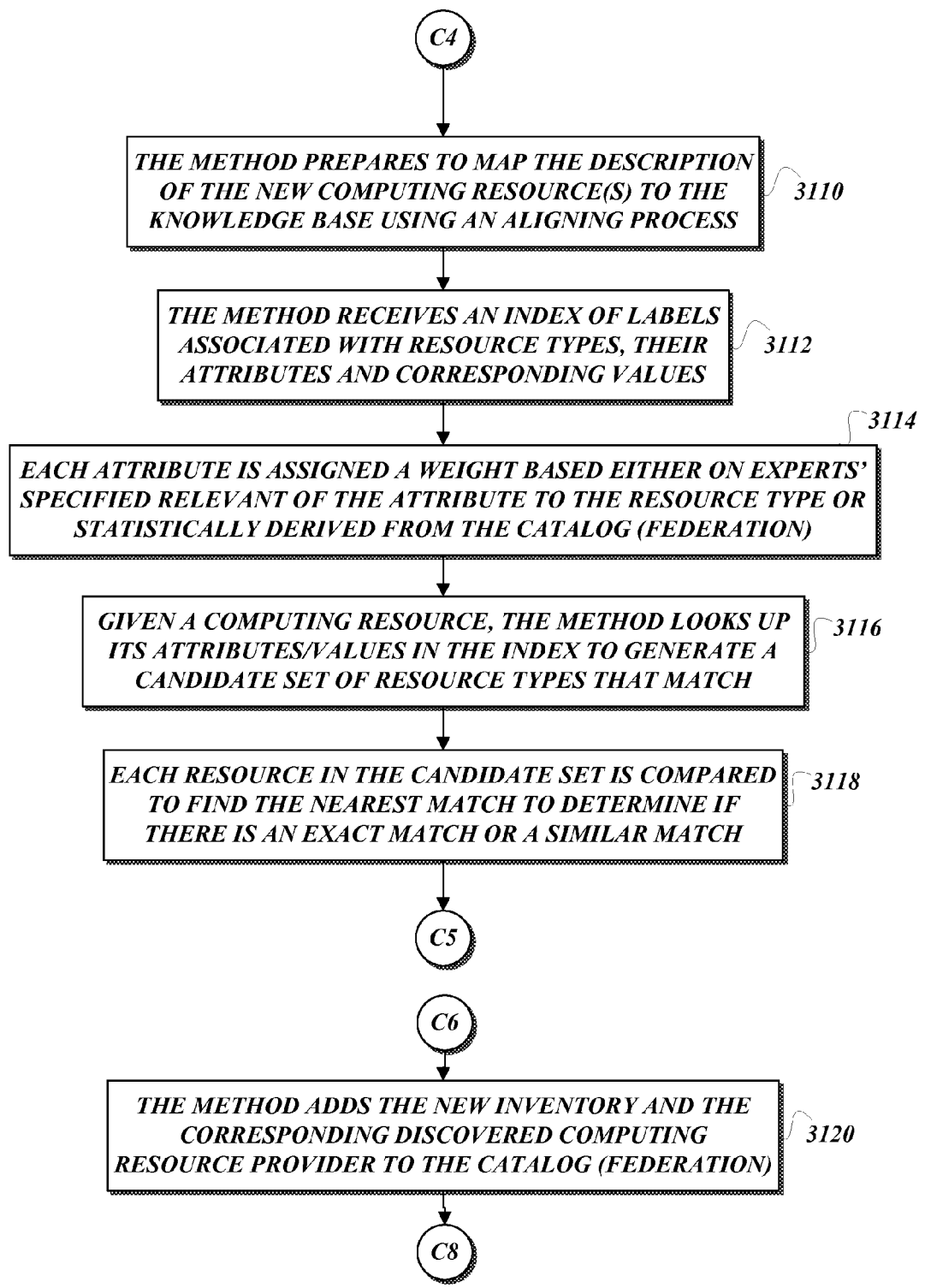
Figure 3K:
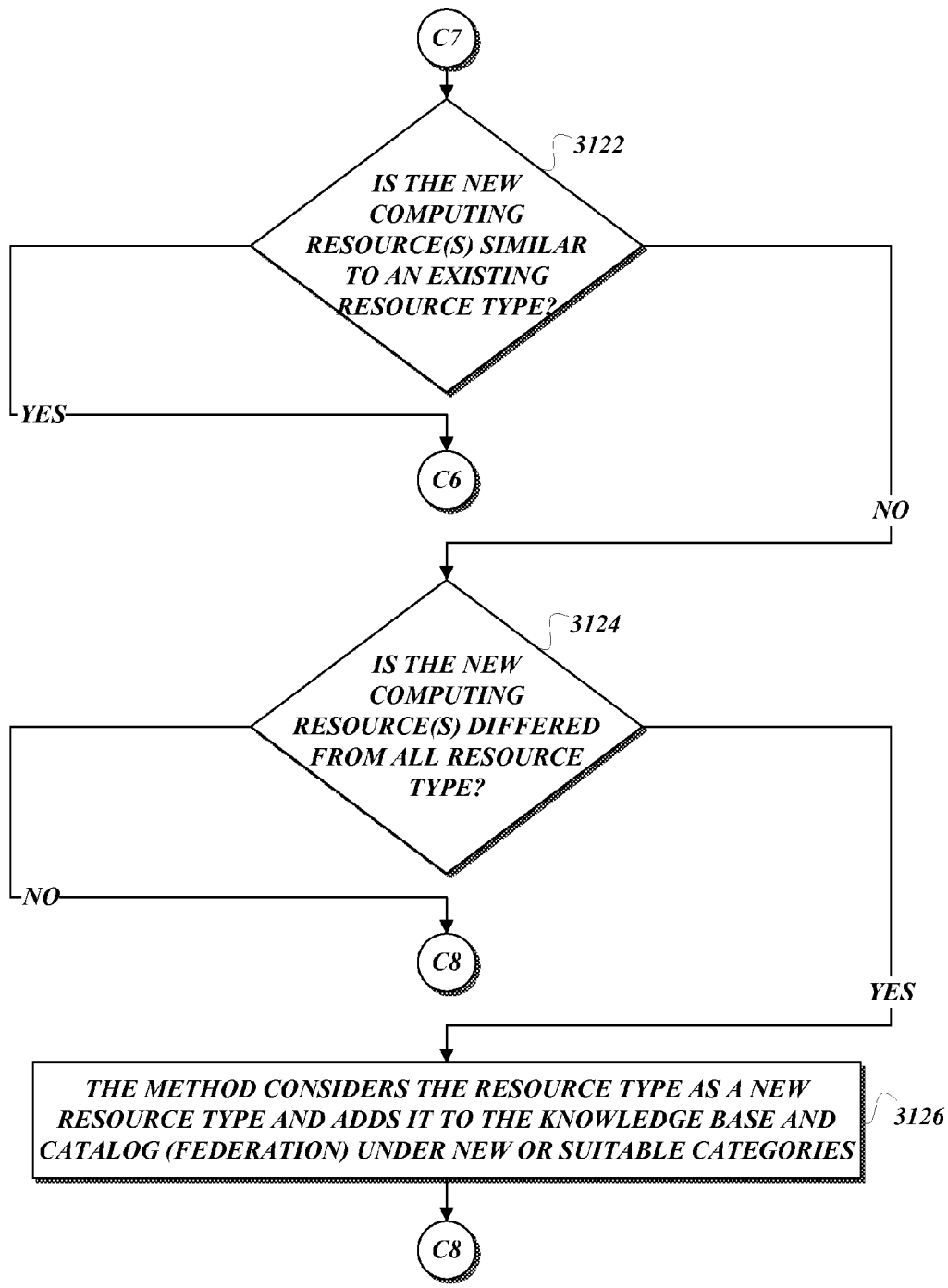
Figure 3L:
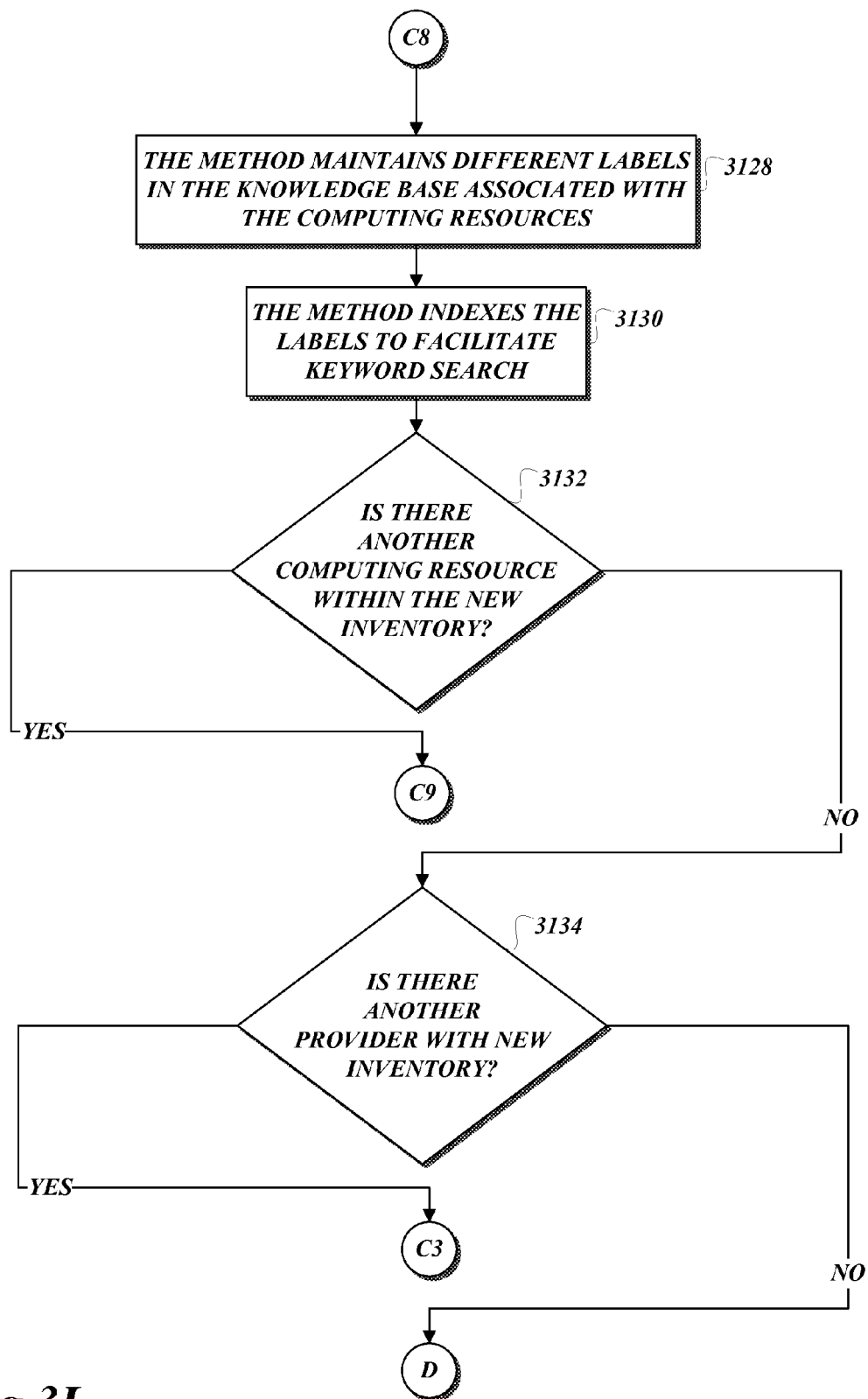
Figure 3M:
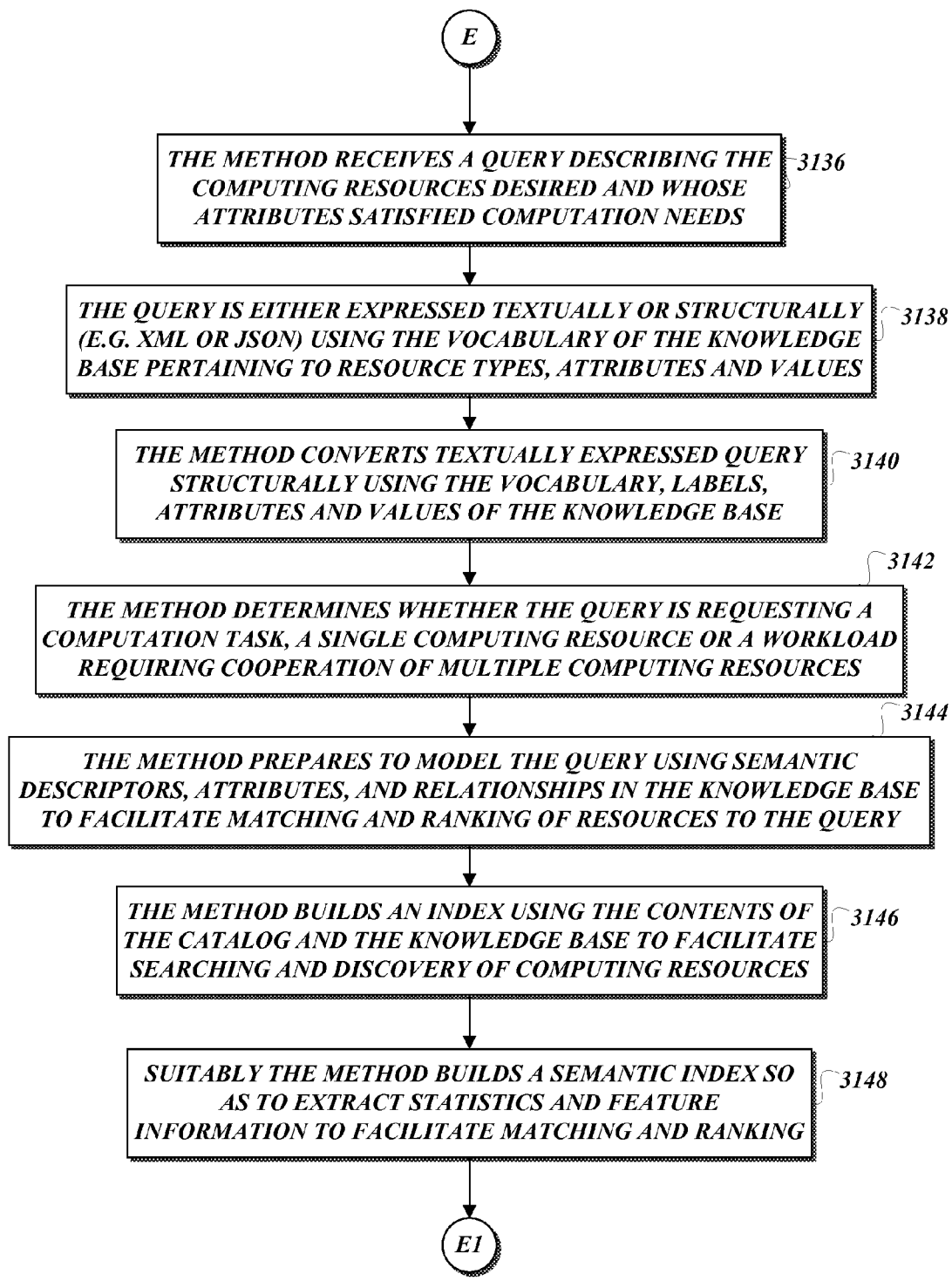
Figure 3N:
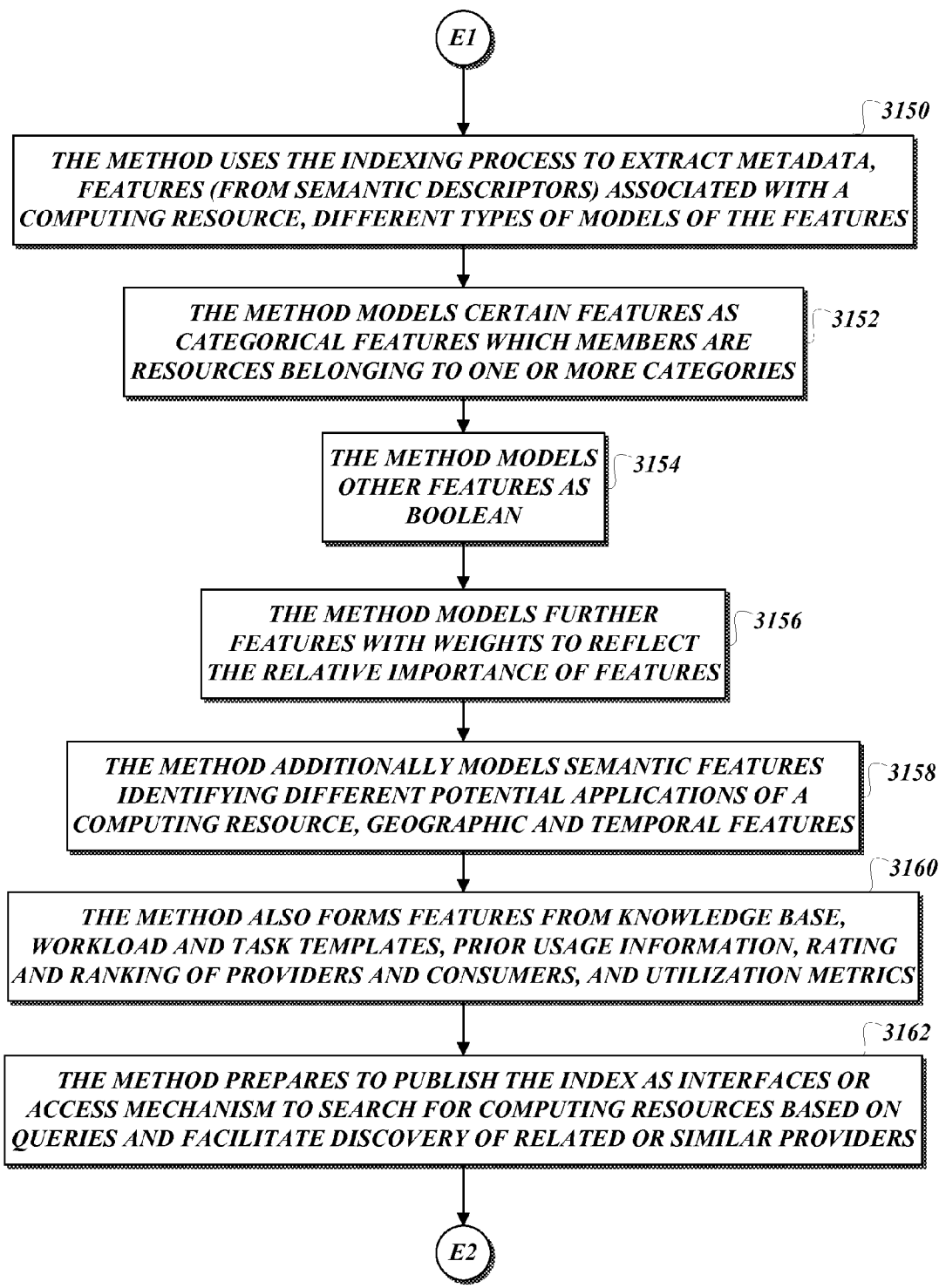
Figure 3O:
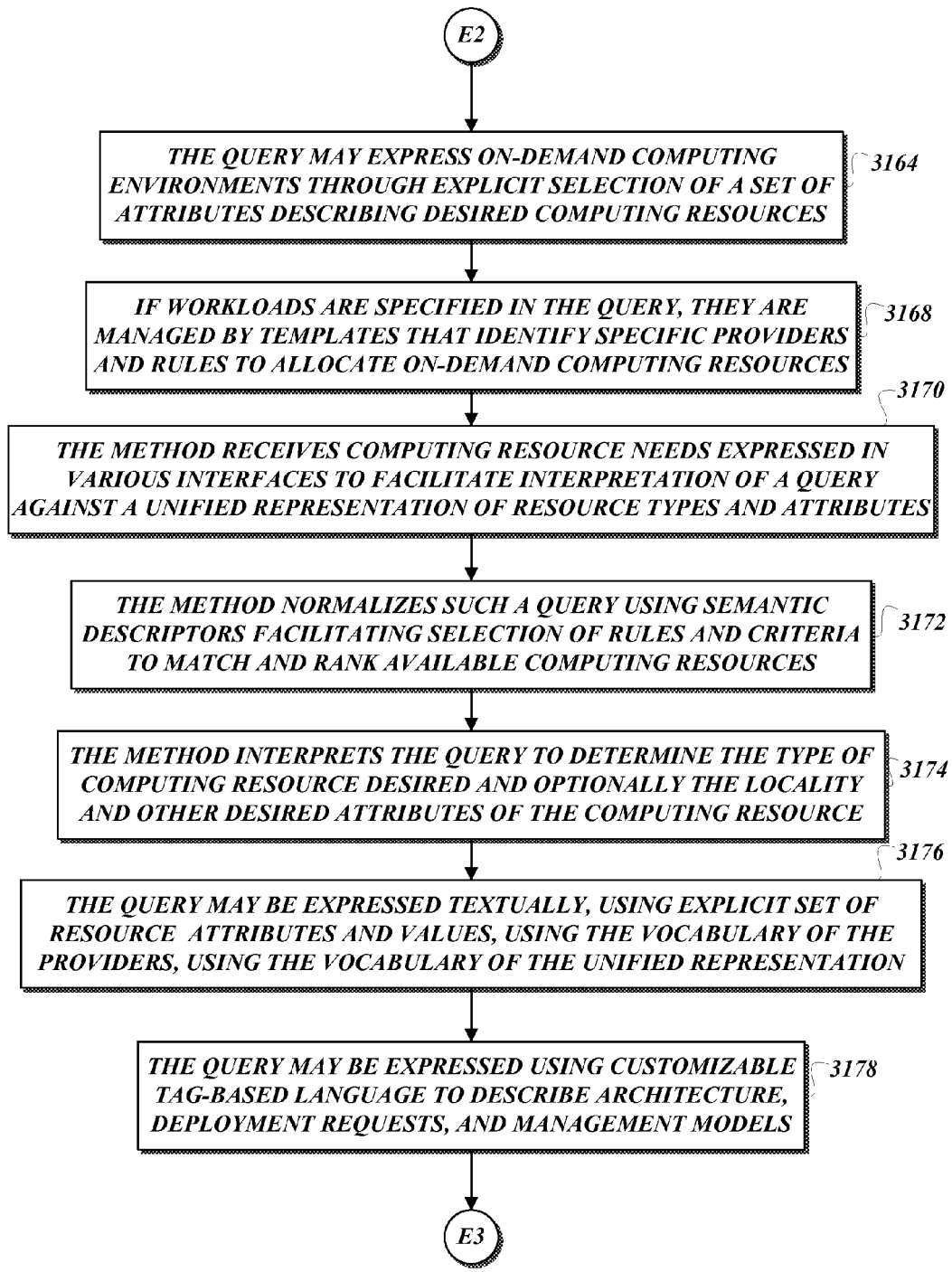
Figure 3P:
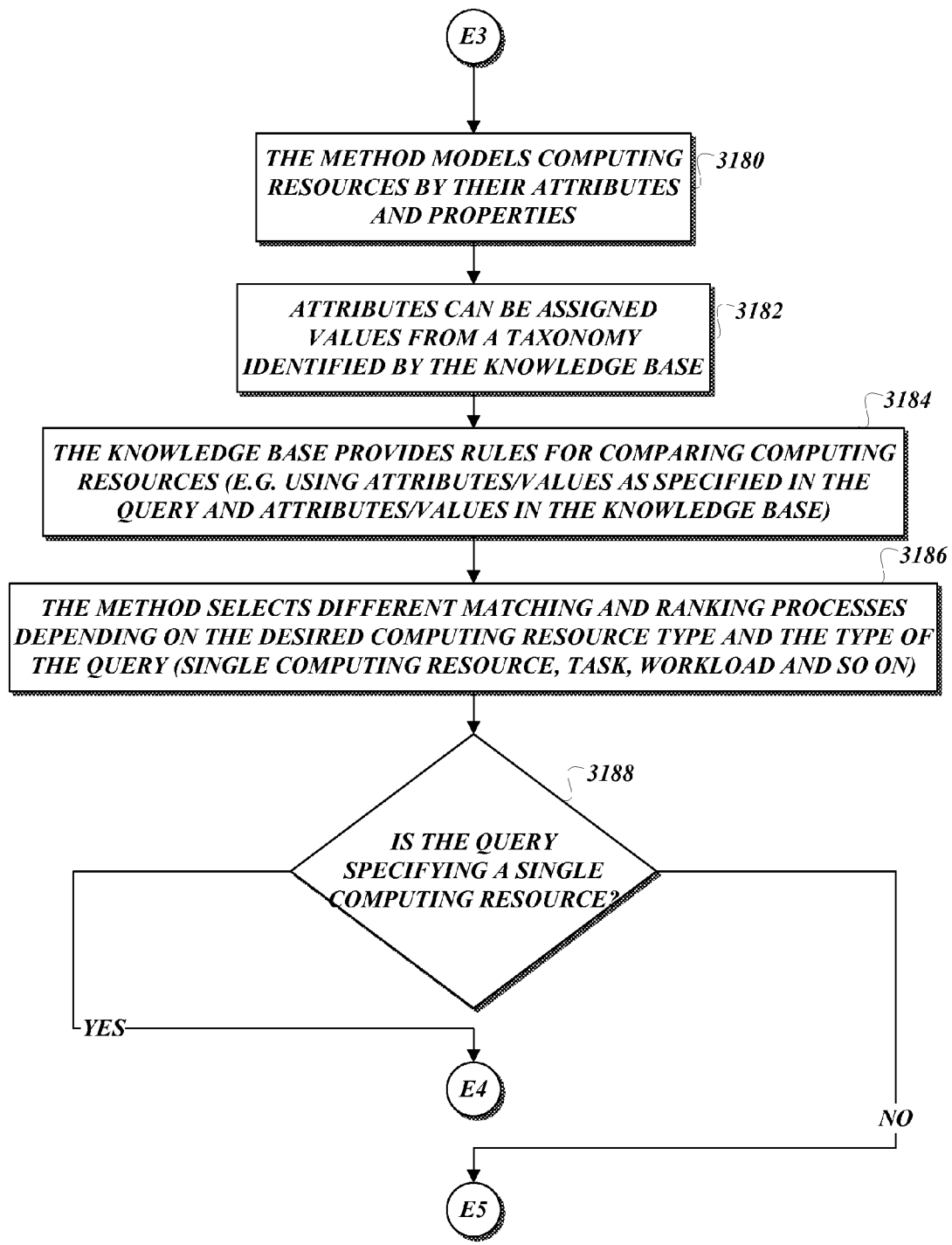
Figure 3Q:
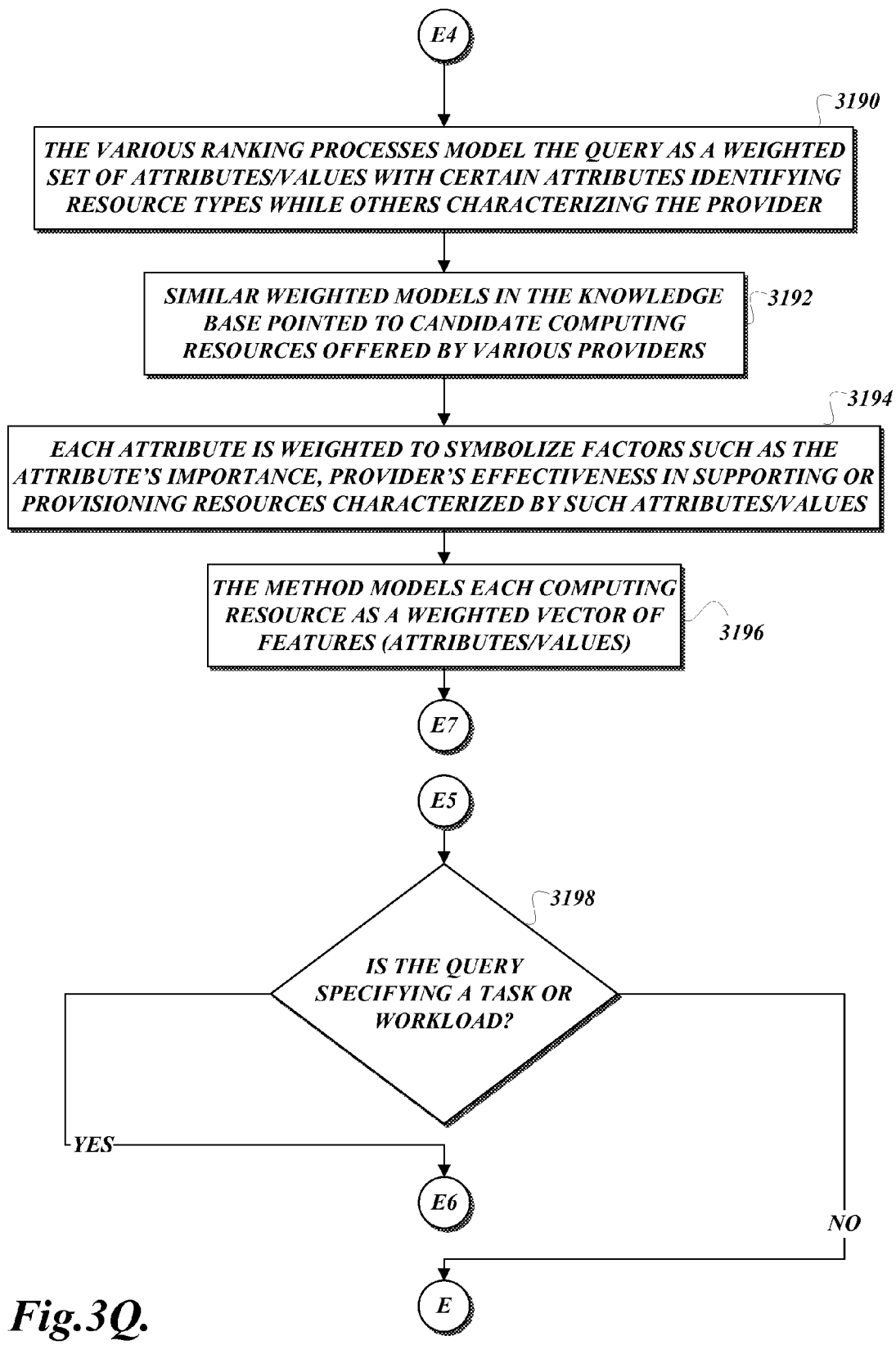
Figure 3R:
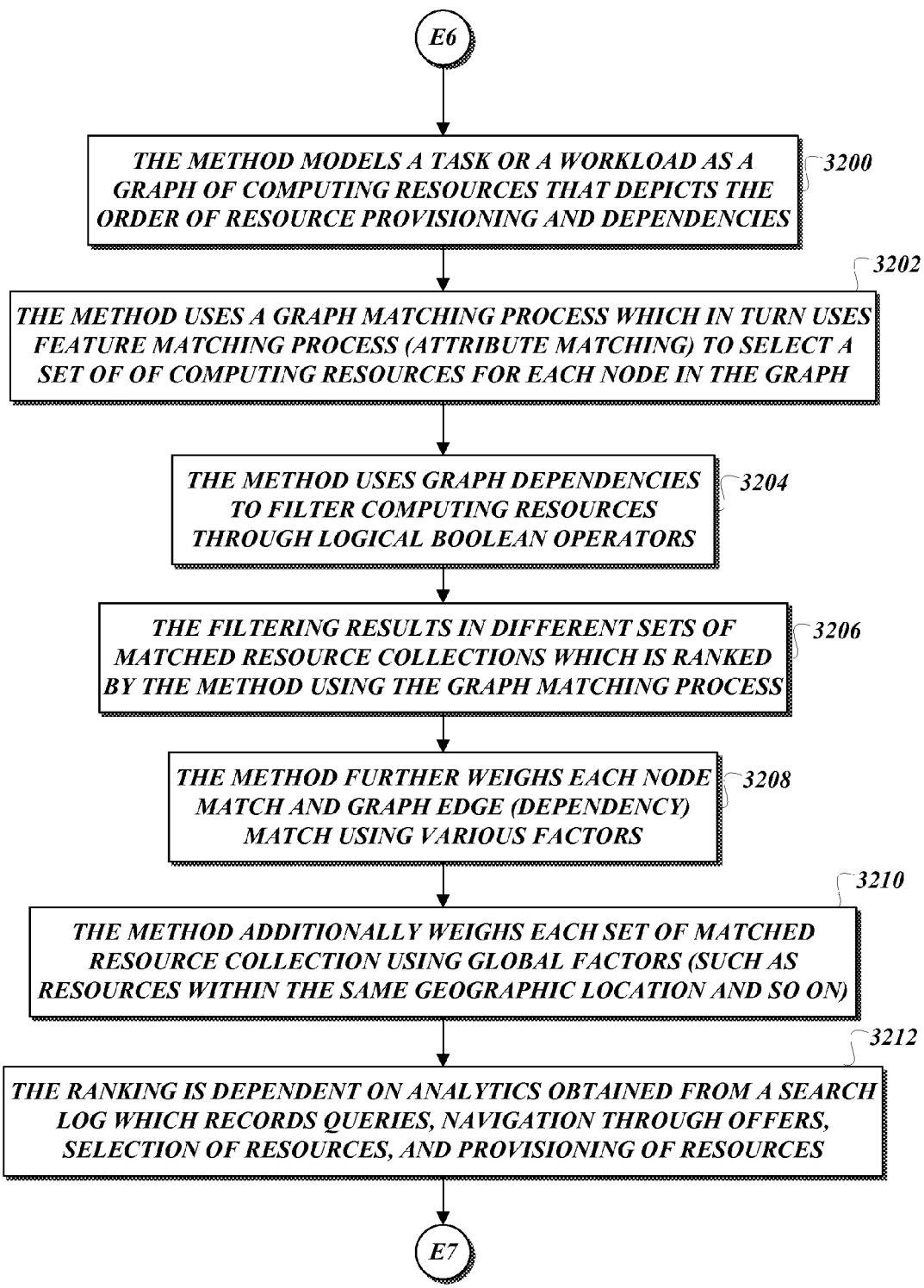
Figure 3S:
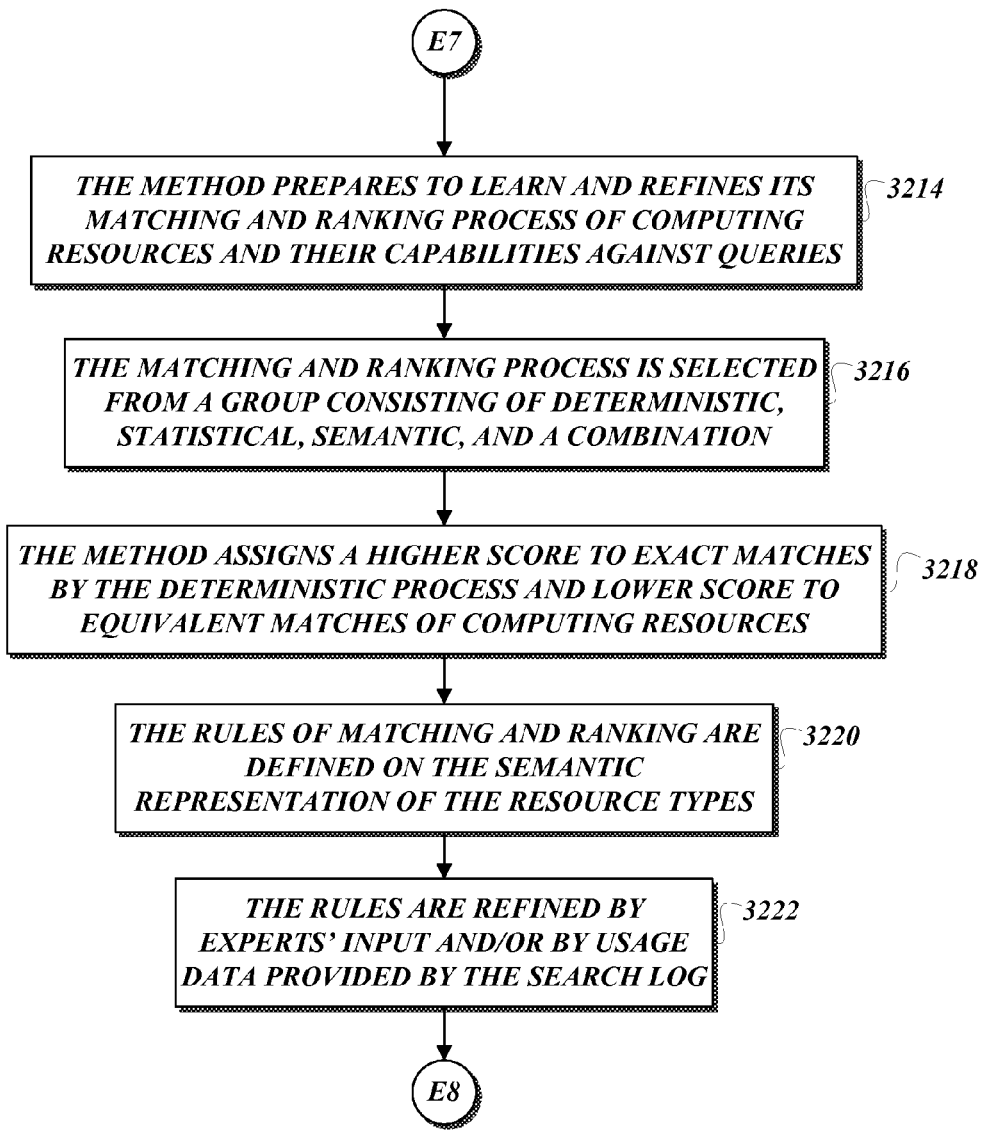
Figure 3T:
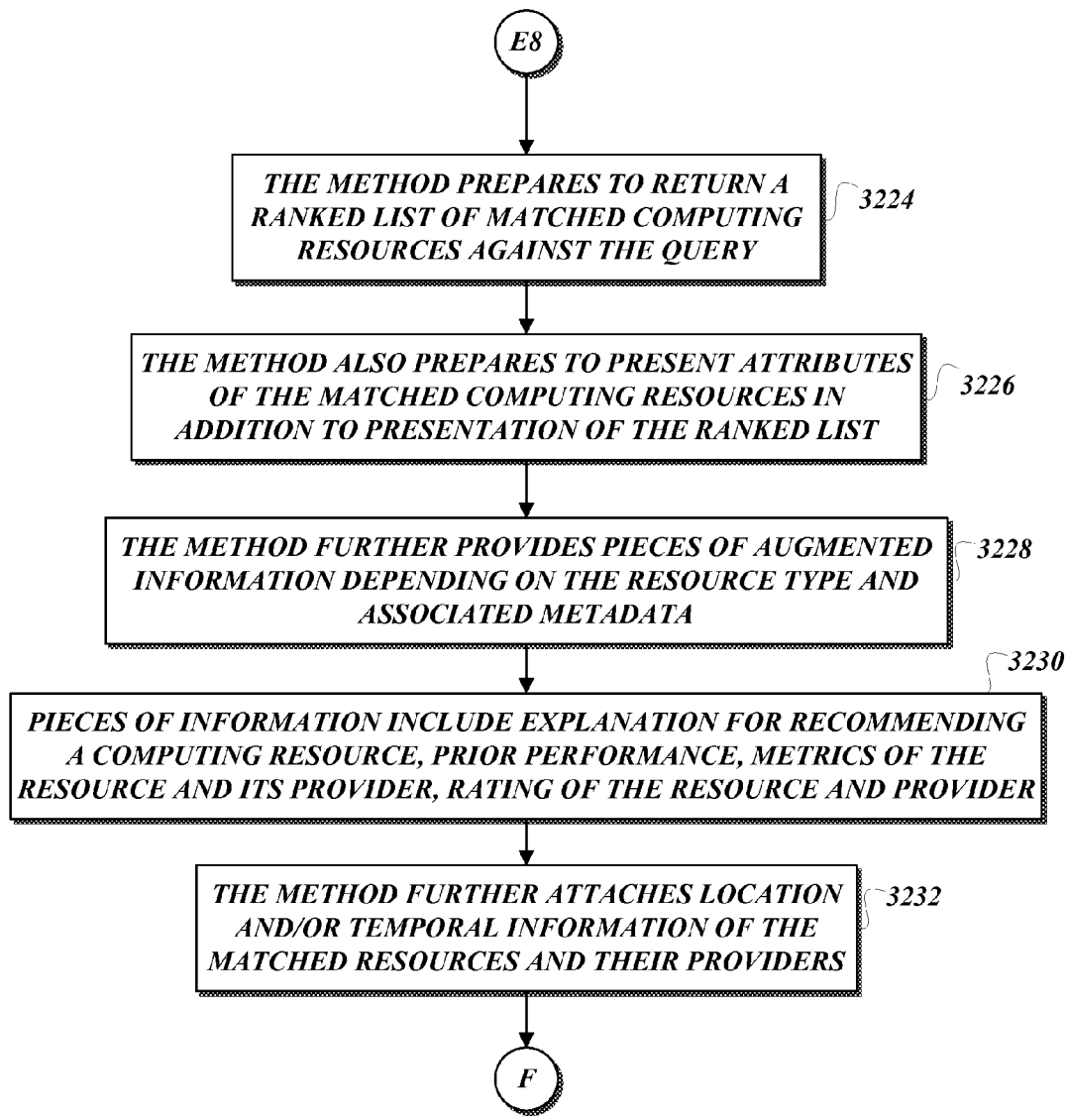

FIGS. 3A-3T illustrate a software method 3000 for organizing and servicing on-demand computing queries via pieces of networked hardware, such as those connected with the cloud organizing system 102. Specifically, the software method 3000 details building, maintaining, and using a web of computing resources through, among other methods, searching and discovering appropriately matched computing resources for a consumer's computing needs. From the start block, the method 3000 proceeds to a set of method steps 3002, defined between a continuation terminal ("Terminal A") and an exit terminal ("Terminal B"). The set of method steps 3002 describes organizing cloud computing resources into a catalog and/or knowledge base by discovering them and processing them. More specifically, the set of method steps 3002 gathers computing resource related information from different data sources to build, maintain, and refresh a catalog and/or knowledge base by: crawling one or more data sources; identifying computer resource providers and information related to enumerating and accessing their computing resources in on-demand compute environments; identifying computing resource descriptions and access information within the data sources; identifying the different types of workloads and tasks that can be performed using one or more of the data sources; learning dependencies between computing resources and workload templates from one or more data sources; mapping and/or formatting resource information produced by previous steps into a structured knowledge base of computing resources; mapping and/or linking of two or more computing resource catalogs and knowledge bases; storing and/or indexing the catalog and knowledge base to enable search and discovery of resources and subsequently publishing the catalog through application programming interfaces; and dynamically updating the resource description and provider information to refresh the inventory of computing resources.

From Terminal A (FIG. 3B), the method proceeds to block 3008 where the method uses web search engines or direct queries to identify a list of computing resource providers (in the form of websites, APIs, and cloud platforms) that provide on-demand computing services. The method then continues to another continuation terminal ("Terminal A1"). From Terminal A1 (FIG. 3B), the method 3000 proceeds to block 3010 where an identified provider, its web pages, APIs, or platforms are processed to inventory the on-demand computing services including accessibility, attributes, properties, and pricing. At block 3012, the method identifies the on-demand computing environment by noting computing platforms, regional operation, country operation, and so on. At block 3014, the method receives additional information about the types of computing resources that are available in those environments from the computing resource provider. At block 3016, the method receives service interfaces to enlist computing resources, inventory information, provisioning, and use of these computing resources. At block 3018, the method receives metadata regarding computing resources, such as specifications, licenses, price, location, availability, physical hardware, virtual machine, computing platform, and interfaces. At block 3020, the method receives metadata regarding the computing resources, such as operating systems, software components, applications and application stacks, as well as development stacks. The method may receive other pieces of information for curation, such as hyperlinks to the different on-demand environments that a computing resource provider offers. If this hyperlink is a web service that includes methods to enlist resources, then the web services are used to ingest resource offerings to the catalog as well as to use them to monitor and maintain the inventory of resource offerings. The method may yet receive other pieces of information, such as hyperlinks to the website of the computing resource provider. These are processed along with other such websites that are crawled automatically to discover other computing resource providers. The method then continues to another continuation terminal ("Terminal A2").

From Terminal A2 (FIG. 3C), the method proceeds to decision block 3022 where a test is performed to determine whether there is another identified provider. If the answer to the test at decision block 3022 is YES, the method 3000 proceeds to Terminal A1 and skips back to block 3010 where the above-identified processing steps are repeated. Otherwise, if the answer to the test at decision block 3022 is NO, then the method proceeds to block 3024 where the method receives search logs, if any, that capture the task descriptions submitted by users' subsequent selections of computing resources. At block 3026, the method receives optimal configuration, if any, of information and dependencies to install and operate computing resources. At block 3028, the method receives subject matter experts' description of prior knowledge on tasks and workloads. At block 3030, the method forms/updates the catalog by classifying computing resources under various categories, while those computing resources with suitable attributes are collectively named. At block 3032, the method obtains a listing of categories and names used to identify attributes of the computing resources and metadata, which are indexed to support queries. The method then continues to another continuation terminal ("Terminal A3").

Digressing, the catalog is a repository of information and knowledge about computing resources that includes, but is not limited to, real and virtual machines, storage, operating system, application, and development stacks. The life cycle of portions of the catalog is suitably aligned with the life cycle of the computing resources it manages. Individual cloud platforms and providers maintain an inventory of the computing resources they offer through their on-demand computing platforms. The catalog is also a collection and organization of the inventories from different computing resource providers for the purpose of finding, discovering, and using these resources across cloud platforms and computing resource providers. Different types of resources are curated and organized in the catalog. The resources are associated with metadata that enables its organization as well as provides the features for search and matching of resources to consumers' tasks and workloads. The catalog also curates templates for tasks and workloads with the models capturing the characteristics of typical computing resources that are appropriate for the tasks and workloads.

From Terminal A3 (FIG. 3D), the method prepares to record and/or predict computing resource inventory levels of computing resource providers. See block 3034. The method then continues to another continuation terminal "(Terminal A4"). One piece of information pertaining to a computing resource description is the availability of the computing resources of a particular type that can be provisioned successfully to consumers by a computing resource provider. While on-demand computing environments wish to become elastic or achieve the ability to provide any number of resources requested by the consumer, the reality of computational environments limits the physical infrastructure of the computing resource provider. Current and relevant information on inventory levels is revealed by the search and discovery steps to provide suitable results for resource queries. For example, the number of virtual machines that can be provisioned by a computing resource provider is limited by the number of physical machines the provider has. As another example, the number of software licenses they can offer on-demand depends on the available set of unused licenses. Various embodiments include software steps for capturing and predicting inventory levels for a given provider based on different resource information maintained in the computing environment or exposed by their Web services.

Continuing from Terminal A4, the method 3000 proceeds to decision block 3036 where a test is performed to determine whether there are interfaces accessible to inventory a provider. If the answer to the test at decision block 3036 is YES, the method proceeds to block 3038 where the interfaces are invoked and the inventory levels of the provider are recorded, such as the number of virtual machines, software licenses, and so on. The method then continues on to another continuation terminal ("Terminal A6"). Otherwise, the answer to the test at decision block 3036 is NO, and the method 3000 proceeds to block 3040 where the method executes a probabilistic process to compute inventory levels of various computing resources of the provider. At block 3042, specifically, the method executes a probabilistic process to compute inventory levels of virtual machines of the provider.

Digressing, the following steps predict virtual machine inventory based on capacity information on physical infrastructure available in an on-demand computing environment. However, it would be appreciated by one skilled in the art that these steps are extensible to predicting the inventory of other types of resources based on their license and/or capacity information. The inventory is dynamically updated in the catalog and different parameters contribute to the prediction of resource types at a provider including, but not limited to, the variety of resources available at the provider, their earlier utilization rate in a federation as well as outside channels, the resource provider's location and the consumer's demand at that location, time and date of request fulfillment and duration of usage. At block 3044, the method receives current usage of physical resources (e.g., physical computing machines) and capacity of the provider at a given service location identified by service end point. The method then continues to another continuation terminal ("Terminal A5").

From Terminal A5 (FIG. 3E), the method proceeds to block 3046 where, specifically, the method receives the number of virtual machines of different types which are provisioned to different users (current usage). At block 3048, the method further receives CPU speed, memory, and disk storage for various physical resources at the provider end point. At block 3050, the method then calculates a minimum value of an allocation function to ascertain the number of virtual machines of a particular type that can be provided by a physical machine. At block 3052, the method repeats the calculation for combinations of virtual/physical machines to determine an upper limit of virtual machines of a particular type that can be allocated by the provider. At block 3054, each upper limit is a metric that can be weighted by factors to generate a probabilistic model of inventory levels of the provider.

Digressing mathematically, Let $\{V_1, V_2, \ldots, V_n\}$ be different types of virtual machines supported by the providers with $n_i^V$ being the number of virtual machines of type $V_i$ that are currently utilized. Let $\{P_1, P_2, \ldots, P_k\}$ be the different types of physical resources available at the provider with $n_j^P$ being the number of physical resources of type $P_j$ that are available at the provider. Each virtual machine is described by a set of attribute values. Let $\{a_1, a_2, \ldots, a_m\}$ be the subset of virtual machine attributes with their equivalent attributes of the physical resource. For example, these attributes can correspond to CPU speed, memory, and disk space. Each virtual machine, $V_i$, has its own values for these attributes given by $\{v_{a_1}^i, v_{a_2}^i, \ldots, v_{a_m}^i\}$. Similarly, each physical resource, $P_j$, has its own values for these attributes given by $\{p_{a_1}^j, p_{a_2}^j, \ldots, p_{a_m}^j\}$. Each attribute has corresponding allocation function $f_a(v_a^i, p_a^j)$ at determines the number of allocations of a particular virtual machine attribute value that can be mapped to a physical attribute value. In the simple case, all of the mandatory attributes—as identified by $\{a_1, a_2, \ldots, a_m\}$—have to be satisfied by the resources. Thus, the minimum value of the allocation function provides the number of virtual machines of a particular type that can provided by a physical machine. This computation is performed for combinations of virtual machine types and physical machines of a provider to determine inventory levels. The metric thus computed provides an upper limit on the number of virtual machines of a particular type that can be allocated by the provider. These metrics can be weighted by other factors identified above to generate a probabilistic model for the inventory of a provider. For example, while a provider may offer five different types of virtual machines, the distribution of virtual machine types that are typically used by the provider's consumers plays a part in determining the likelihood of assigning and allocating virtual machines of a particular type. Most sought after virtual machine types are likely to be utilized more at a particular provider and hence the allocation score computed above is suitably weighted to reflect true inventory. The above digression provides an approach for estimating and providing a probabilistic score for the prediction of inventory for a given provider. Additional attributes may contribute to the correct determination of the inventory and these features can be used to obtain an improved probabilistic inventory model.

Returning, at block 3056, the method executes other probabilistic processes to compute inventory levels of other computing resources of the provider, such as physical hardware, computing platform, and its interfaces. At block 3058, the method executes further probabilistic processes to compute inventory levels of other computing resources, such as operating systems, software components, applications, and application stacks, as well as development stacks. The method then continues to Terminal A6.

From Terminal A6 (FIG. 3F), the method proceeds to decision block 3060 where a test is performed to determine whether there is another provider. If the answer to the test at decision block 3060 is YES, the method skips back to decision block 3036 where the above-identified processing steps are repeated. Otherwise, the answer to the test at decision block 3060 is NO, and the method proceeds to Terminal B.

From Terminal B (FIG. 3A), the method 3000 proceeds to a set of method steps 3004, defined between a continuation terminal ("Terminal C") and an exit terminal ("Terminal D"). The set of method steps 3004 curates the catalog and/or knowledge base by enriching it and enabling semantic searching of the catalog. More specifically, the set of method steps 3004 facilitates curating a knowledge base of resource description, workload and task templates so as to enrich a computing resource catalog and enable semantic searching of computing resources through annotating, by consumers and experts, of their knowledge on resource types, properties and their values, relationships and dependencies, workload and task descriptions; crawling one or more data sources; identifying resource descriptions and extracting their attributes, typical tasks and workloads; learning dependencies among resources and typical configuration that constitute workload and task descriptions; learning to detect and derive rules for matching resources against queries; rating and/or associating different statistics for resource attributes and properties from usage (search) logs; and storing and/or curating knowledge base of resources, workloads and tasks.

From Terminal C (FIG. 3F), the method proceeds to block 3062 where the method prepares to curate information objects, such as computing resources, rules, criteria, and models for matching queries to available computing resources. On-demand computing environments are classified by the curation steps based on the level at which computing service interfaces are accessible by consumers. Infrastructure-as-a-Service provides the abstraction of resources at the physical or virtual machine level with the optional capability to select and use different operating systems. Platform-as-a-Service defines this level of abstraction at the platform level and masks the complexity of where the application capabilities are realized and executed. Software-as-a-Service takes this to the next level of abstraction where the service abstraction is at the application level. Various embodiments include mechanisms for modeling and providing a unified view of computing resources independent of the abstraction level of the underlying service providers and their consumers.

A computing resource is defined as the inclusion of a unit of computing capability that takes certain types of input and generates certain types of output during the duration of their usage. These computing resources can be of different types and take different sets of attributes that describe their characteristics. The different types of computing resources include, but are not limited to, the physical hardware, the virtual machine, the computing platform and its interfaces, operating systems, software components, applications, and application stacks. The unit of computing can be a software application or library in a single machine accessible as a service (for example, a file format translation service in a machine) to an application stack involving hundreds of components realized and executed in a number of machines. For example, one computing resource provider can support virtual machines of three different configurations with increasing memory size whereas another computing resource provider can provide virtual machines of five different configurations with varying combinations of memory size and processing speed. Even with the same virtual machine configurations, different computing resource providers can provide different operating systems, their versions, and applications.

At block 3064, access to computing resources is prepared for curation (such as interfaces and services), which leads to a ranked list of suitable computing resources responsive to a query. At block 3066, the method is further prepared to curate and provides a unified view of computing resources independent from their providers' specified abstraction of underlying surfaces. The method then continues to another continuation terminal ("Terminal C1").

From Terminal C1 (FIG. 3G), the method proceeds to block 3068 where the method builds a knowledge base (as a self-learning system) to align computing resources from different computing resource providers. At block 3070, the build is seated initially from a select set of computing resource providers and domain expert understanding of the computing resources provided by these providers. At block 3072, web semantic languages (such as XML or RDF) are used to describe the types of computing resources, attributes, and properties (such as semantic descriptors). At block 3074, said semantic descriptors are also used to describe the computing resources classified in the catalog, metadata, and features which can be called out in search expressions of queries. At block 3076, the method categorizes computing resources into types and associates each computing resource with one or more attributes. Progressing to block 3078, the method categorizes types under different hierarchies so as to facilitate computing resource matching, ranking, and discovery. Next, at block 3080, attributes may include CPU, clock, memory, access time, network, storage, and other dependencies that are computationally desired to load and use a computing resource. At block 3082, these attributes are discovered by the method, whose importance to a type is determined, and the similarity of attributes from different providers is identified. The method then continues to another continuation terminal ("Terminal C2").

From Terminal C2 (FIG. 3H), the method curates models for attributes to facilitate evaluating and finding similar resource types in the catalog at block 3084. Next, at block 3086, the method associates semantic descriptors with numeric weights or qualitative rankings to assist in the detection and scoring of similar computing resource types. The method progresses to block 3088 where the method further curates information about templates for workloads and computational tasks. At block 3090, the method curates template information for workloads from optional dependencies described between cooperation of computing resources. At block 3092, the method curates task information based on the description of computing that a provider provides or from a consumer's query for performing a computation. Next at block 3094, the method may break a task down to a number of workloads which may or may not have dependencies between computing resources. At block 3096, the method may gather such template information from expert users, search logs of queries, and a search selection of computing resources as well as provider's description. At block 3098, as the method curates, it places the information into the catalog and/or knowledge base. The method then continues to another continuation terminal ("Terminal C3").

From Terminal C3 (FIG. 3I), the method 3000 proceeds to block 3100 where the method prepares to align (or map) resource types and computing resources across different computing resource providers to facilitate matching, searching, and discovery of resources. The method receives a new inventory (computing resource(s)) of a computing resource provider. The method then continues to another continuation terminal ("Terminal C9"). From Terminal C9 (FIG. 3I), the method 3000 proceeds to block 3104 where the method identifies capabilities of the new inventory. At block 3106, the method identifies equivalent capabilities, if any, of one or more resource types in the knowledge base. The method 3000 then continues to another continuation terminal ("Terminal C4").

From Terminal C5 (FIG. 3I), the method 3000 proceeds to decision block 3108 where a test is performed to determine whether the new computing resource is matched to an existing resource type. If the answer to the test at decision block 3108 is YES, the method proceeds to another continuation terminal ("Terminal C6"). Otherwise, the answer to the test at decision block 3108 is NO, and the method proceeds to another continuation terminal ("Terminal C7").

From Terminal C4 (FIG. 3J), the method 3000 proceeds to block 3110 where the method prepares to map the description of the new computing resource to the knowledge base using an aligning process. At block 3112, the method receives an index of labels associated with resource types, the attributes, and corresponding values. At block 3114, each attribute is assigned a weight based either on experts' specified relevancy of the attribute to the resource type or statistically derived from the catalog (federation). At block 3116, given a computing resource, the method looks up its attribute/values in the index to generate a candidate set of resource types that match. At block 3118, each resource in a candidate set is compared to find the nearest match to determine whether there is an exact match or similar match. The method then continues to Terminal 5 and skips back to decision block 3108 where the above-identified processing steps are repeated.

From Terminal C6 (FIG. 3J), the method 3000 proceeds to block 3120 where the method adds the new inventory and the corresponding discovered computing resource provider to the catalog (federation). The method then continues to another continuation terminal ("Terminal C8").

From Terminal C7 (FIG. 3K), the method 3000 proceeds to decision block 3122 where a test is performed to determine whether the new computing resource is similar to an existing resource type. If the answer to the test at decision block 3122 is YES, the method 3000 proceeds to Terminal C6 and skips back to block 3120 where the above-identified processing steps are repeated. Otherwise, the answer to the test at decision block 3122 is NO, and the method proceeds to another decision block 3124 where a test is performed to determine whether the new computing resource differs from all resource types. If the answer to the test at decision block 3124 is NO, the method proceeds to Terminal C8. Otherwise, if the answer to the test at decision block 3124 is YES, then the method 3000 proceeds to decision block 3126 where the method considers the resource type as a new resource type and adds it to the knowledge base and/or catalog under new or suitable categories. The method then continues to Terminal C8.

Digressing, when computing resources do not match to existing models, they are identified as candidates to be added into the knowledge base of computing resources. Rules and probabilistic models are used to determine whether the candidates are a new type of resource or a variation of existing resource types and to identify the categories under which to include and curate in the catalog. For example, a virtual machine resource that is offered with an attribute of startup time is curated as an extension of a virtual machine resource type with an additional attribute of startup time. The alignment is performed between the knowledge base and the representation of resources of a computing resource provider to categorize the resource types to appropriate resource type categories. Each category of resource is described by a set of labels as well as metadata that describes the utility of the resource. For example, a particular virtual machine offering will have fixed values for the attributes of CPU speed, memory, and disk space. Resources in the knowledge base are organized in different hierarchies based on their types and categories assigned to them. Such categorization helps in the alignment of resources. Given a resource, the alignment process determines whether the resource is a previously unknown resource type, or is a known resource type with similar attribute-values as an existing resource. Given that the knowledge base includes different types of resources, the alignment also assigns appropriate categories for the resource and determines its position in the hierarchy of resource types. The knowledge base also maintains different labels associated with the resources. These labels are indexed to enable keyword search. Given a new resource, the labels for the resource are matched against the index to identify a candidate set of resource types to match.

From Terminal C8 (FIG. 3L), the method 3000 proceeds to block 3128 where the method maintains different labels in the knowledge base associated with the computing resources. At block 3130, the method indexes the labels to facilitate a keyword search. The method then proceeds to decision block 3132 where a test is performed to determine whether there is another computing resource within the new inventory. If the answer to the test at decision block 3132 is YES, the method proceeds to Terminal C9 and skips back to block 3104 where the above-identified processing steps are repeated. Otherwise, the answer to the test at decision block 3132 is NO, and the method proceeds to another decision block 3134 where another test is performed to determine whether there is another provider with new inventory. If the answer to the test at decision block 3134 is YES, the method 3000 proceeds to Terminal C3 and skips back to block 3100 where the above-identified processing steps are repeated. Otherwise, the answer to the test at decision block 3134 is NO, and the method proceeds to Terminal D.

From Terminal D (FIG. 3A), the method 3000 proceeds to a set of method steps 3006, defined between a continuation terminal ("Terminal E") and an exit terminal ("Terminal F"). The set of method steps 3006 receives on-demand computing queries and services them. More specifically, the set of method steps 3006 facilitates capturing consumers' queries, understanding them as a request for a computing resource, workload, or task, and providing appropriately matched resources for the query by processing and/or understanding textual queries; capturing structural inputs and forms to facilitate apprehension of advanced user queries for resources, workloads, and tasks; interfacing and/or representing using semantic web languages (e.g., XML, RDF, OWL, and so on) for computing resource, workload, and task requests; semantic indexing of computing resource catalog and knowledge base; matching and/or ranking of resources against consumer queries; presenting navigation and/or augmenting search results using computing resource and provider specific metrics; selecting and/or semi-automation the provisioning of computing resources; and logging of usage and/or deriving of metrics on resources, providers, consumers, and search system for the purpose, among many purposes, of learning compute resource utilization, create new workloads or update existing workloads and monitoring resource utilization.

From Terminal E (FIG. 3M), the method proceeds to block 3136 where the method receives a query describing the computing resources desired and whose attributes would, if found, satisfied computation needs. At block 3138, the query is either expressed textually or structurally (e.g., XML or JSON) using the vocabulary of the knowledge base pertaining to resource types, attributes, and values. At block 3140, the method converts textually expressed queries structurally using vocabulary, labels, attributes, and values of the knowledge base. Progressing to block 3142, the method determines whether the query is requesting a computation task, a single computing resource, or a workload requiring cooperation of multiple computing resources.

Digressing, workload queries are responded to by the method 3000 by returning appropriate matched resources. Task responses by the method 3000 can be quotations returned by one or more computing resource providers that are dynamically and collaboratively put together by different stakeholders. The knowledge base has templates that represent workloads and tasks along with their descriptions, metadata, and labels.

Returning, at block 3144, the method prepares to model the query using semantic descriptors, attributes, and relationships in the knowledge base to facilitate matching and ranking of resources through the query. At block 3146, the method builds an index using the contents of the catalog and the knowledge base to facilitate searching and discovery of computing resources. At block 3148, suitably the method builds a semantic index so as to extract statistics and feature information to facilitate matching and ranking. The method then continues to another continuation terminal ("Terminal E1").

Digressing, consumers in current on-demand computing environments have limited choice in selecting the resource providers and the type of resources they can use for their computing needs. Conventional manual methods are available for selecting resource providers and limited options are available for selecting appropriate resources for their compute workload. Various embodiments facilitate the use of computing resources from different resource providers and exploiting the elastic behavior of on-demand computing environments. Various embodiments facilitate modeling and indexing the automatically generated computing resources catalog, understanding and modeling consumer computing needs based on their queries, dynamically matching available computing resources in the federated on-demand computing environment to satisfy a consumer query, and automatically suggesting related resources that complement consumers' computing needs. In one embodiment, the use of the search interfaces facilitates a marketplace for different resource providers to bid for and advertise their computing resources against consumers' computing needs. In another embodiment, the method 3000 facilitates services and derives information from usage that enables external tools and services to use a common translation and resource modeling services to enable customers to design, model, deploy, and manage workloads and resource utilization lifecycle.

From Terminal E1 (FIG. 3N), the method proceeds to block 3150 where the method uses the indexing process to extract metadata, features (from semantic descriptors) associated with a computing resource, and different types of models of the features. At block 3152, the method models certain features as categorical features, whose members are resources belonging to one or more categories. At block 3154, the method models other features as Boolean. At block 3156, the method models further features with weights to reflect the relative importance of features. At block 3158, the method additionally models semantic features identifying different potential applications of a computing resource, such as geographic and temporal features. At block 3160, the method also forms features from knowledge base, workload, and task templates, prior user information, rating and ranking of providers and consumers, and utilization metrics. At block 3162, the method prepares to publish the index as interfaces or access mechanisms to search for computing resources based on queries and facilitate browsing and discovery of related or similar providers. The method then continues to another continuation terminal ("Terminal E2").

From Terminal E2 (FIG. 3O), the method proceeds to block 3164 where the query may express on-demand computing environments through explicit selection of a set of attributes describing desired computing resources. At block 3168, workloads are specified in the query, and they are managed by templates that identify specific providers and rules to allocate on-demand computing resources. At block 3170, the method receives computing resource needs expressed in various interfaces (and/or modalities) to facilitate interpretation of a query against a unified representation of resource types and attributes. At block 3172, the method normalizes such a query using semantic descriptors facilitating selection of rules and criteria to match and rank available computing resources. At block 3174, the method interprets the query to determine the type of computing resource desired, and optionally, the locality and other desired attributes of the computing resource. At block 3176, the query may be expressed textually using an explicit set of resource attributes and values, using the vocabulary of the providers, or using the vocabulary of the unified representation provided by the catalog and/or knowledge base. At block 3178, the query may be expressed using customizable tag-based language to describe architecture, deployment requests, and management models. The method then continues to another continuation terminal ("Terminal E3").

From Terminal E3 (FIG. 3P), the method 3000 proceeds to block 3180 where the method models computing resources by their attributes and properties. Attributes can be assigned values from a taxonomy identified by the knowledge base. See block 3182. At block 3184, the knowledge base provides rules for comparing computing resources (e.g., using attributes/values as specified in the query and attributes/values in the knowledge base). Digressing, for example, the memory property of a virtual machine takes values from the taxonomy of values identified in the knowledge base (e.g., 1 GB, 2 GB, 4 GB, 8 GB, 16 GB, and so on) and the rules to compare the property of an available resource with the desired resource property (e.g., 1.5 GB). A simple rule can be to select the resource with a minimum non-zero difference of the values between that identified in the query and candidate resources. As another example, a resource query of 1 GHz CPU Speed, 1 GB memory, and 20 GB hard disk space running the Windows Server operating system can have multiple matches to virtual machines from different providers. Certain providers may provide the same configuration, while others can provide a resource with the same configuration except with 2 GB memory. These resources are aligned and mapped to provide similar capabilities and are ranked for the purpose of searching and recommendations against user queries.

Computing resource queries to an on-demand computing environment are expressed suitably through identification of the resource type and selected set of resource attributes. These requests are satisfied by matching the desired attributes with existing resources available from current providers. The resource matching is based on the underlying meaning and descriptor of the available resources and their match to the requested resources. The resources matched for a given query can come from multiple providers and from multiple regions. Computing resources are used to perform certain workloads or tasks. Certain workloads require and/or are configured to operate correctly on certain types of computing resources. In addition, certain workloads require certain types of computing resources to be available at the desired time and in the desired configuration for the workload to complete correctly. An e-commerce portal requires the correct application stack and connectors to be configured and operational before a consumer transaction involving credit-card validation and verification can be performed. Resource dependencies captured in workload and task templates in the knowledge base are eligible for use by the method 3000 in matching and ranking of resources against workloads and tasks.

Returning, at block 3186, the method selects different matching and ranking processes depending on the desired computing resource type and the type of query (single computing resource, task, workload, and so on). At decision block 3188, a test is performed to determine whether the query is specifying a single computing resource. If the answer to the test at decision block 3188 is YES, the method continues to another continuation terminal ("Terminal E4"). If the answer to the test at decision block 3188 is NO, the method proceeds to another continuation terminal ("Terminal E5").

From Terminal E4 (FIG. 3Q), the method proceeds to block 3190 where the various ranking processes model the query as a weighted set of attributes/values with certain attributes that identify resource types while others characterize the provider. At block 3192, similar weighted models in the knowledge base point to candidate computing resources offered by various providers. At block 3194, each attribute is weighted to symbolize factors such as the attribute's importance, and the provider's effectiveness in supporting or provisioning resources characterized by such attributes/values. At block 3196, the method models each computing resource as a weighted vector of features (attributes/values). The method then continues to another continuation terminal ("Terminal E7").

Digressing, one suitable weighting process includes the term frequency inverse document frequency. This process views each resource offer or resource query to be represented by a set of weighted features. Each feature is assigned a weight representing the importance or count of the feature of that resource (term frequency) and a weight representing how widespread that feature is across different resources in the computing resource catalog. These measures provide suitable performance to determine appropriate resource matches for computing resource requests. The feature set also includes attributes that describe resource providers. Thus, resources from different providers get different weights based on their appropriateness for consumers' needs.

Returning, from Terminal E5 (FIG. 3Q), the method 3000 proceeds to decision block 3198 where the method performs a test to determine whether the query is specifying a task or workload. If the answer to the test at decision block 3198 is YES, the method continues to another continuation terminal ("Terminal E6"). Otherwise, the answer to the test at decision block 3198 is NO, and the method continues to Terminal E and skips back to block 3136 where the above-identified processing steps are repeated.

From Terminal E6 (FIG. 3R), the method 3000 proceeds to block 3200 where the method models a task or a workload as a graph of computing resources that depicts the order of resource provisioning and dependencies. At block 3202, the method uses a graph-matching process which in turn uses a feature-matching process (attribute matching) to select a set of computing resources for each node in a graph. Progressing to block 3204, the method uses graph dependency to filter computing resources through logical Boolean operators. At block 3206, the filtering results in different sets of matched resource collections, which are ranked by the method using the graph-matching process. At block 3208, the method further weights each node, match, and graph edge (dependency) match using various factors. At block 3210, the method additionally weights each set of matched resource collection using global factors (such as resources within the same geographic location and so on). At block 3212, the ranking is dependent on analytics obtained from a search log which records queries, navigation through offers, selection of resources, and provisioning of resources. The method then continues to Terminal E7.

From Terminal E7 (FIG. 3S), the method 3000 proceeds to block 3214 where the method prepares to learn and refines its matching and ranking process of computing resources and their capabilities against queries. At block 3216, the matching and ranking process is selected from a group consisting of deterministic, statistical, semantic, and accommodation of the above. Progressing to block 3218, the method assigns a higher score to exact matches by the deterministic process and a lower score to equivalent matches of computing resources. At block 3220, the rules of matching and ranking are defined on the semantic representation of the resource types. Next at block 3222, the rules are refined by experts' input and/or by usage data provided by the search log. The method then continues to another continuation terminal ("Terminal E8").

From Terminal E8 (FIG. 3T), the method 3000 proceeds to block 3224 where the method prepares to return a ranked list of matched computing resources against the query. At block 3226, the method also prepares to present attributes of matched computing resources in addition to the presentation of the ranked list. At block 3228, the method further provides pieces of augmented information depending on the resource type and associated metadata. Progressing to block 3230, pieces of information include an explanation for recommending a computing resource, prior performance, metrics of the resource and its providers, and rating of the resource and provider. Next, at block 3232, the method further attaches location and/or temporal information of the matched resources and their providers for presentation. The method then continues to Terminal F and terminates execution.

Digressing, one suitable metric that represents the effectiveness of a provider is the time the provider takes to provision the resources for a given request. The duration starting from the time the consumer selects a computation offer to procure a resource or resources for their tasks and workloads to the time such resources are provisioned and put into operation by the consumer is an indicator of the effectiveness of the provider. Regarding discovery in a few embodiments, search result presentation includes location and temporal information of the resources and its providers. Separately or combined presentation of such information enables consumers to visualize the provisioning and execution of their workloads and tasks. Among other methods, location-based browsing of search results enables consumers to visualize the results in the map. In addition, temporal information is presented on top of location-based presentation to visualize the order of resource provisioning as well as a timeline of events that were performed on behalf of the consumer.

While illustrative embodiments have been illustrated and described, it will be appreciated that various changes can be made therein without departing from the spirit and scope of the invention.

The invention claimed is:

1. A method for organizing cloud computing resources to facilitate human-to-machine and machine-to-machine semantic search and discovery of the cloud computing resources, comprising:
    creating a catalog of different cloud computing resource providers and their cloud computing resources that are available on demand over the Internet;
    creating a knowledge base of types of cloud computing resources storing semantic descriptors of the types, their attributes including relations among cloud computing resources, a taxonomy of their values, and actions that are configured to be performed based on the types and the capabilities of the cloud computing resource providers of the cloud computing resources;
    associating the semantic descriptors with numeric weights or qualitative rankings to assist in detection and scoring of the types;
    dynamically updating the catalog and the knowledge base to refresh pieces of information pertaining to the different cloud computing resource providers, semantic descriptors of cloud computing resources, types, their attributes, and the taxonomy of their values so as to inventory cloud computing resources that are available on demand over the Internet;
    providing an application programming interface for semantic search functionality for semantic search and discovery of the cloud computing resources and cloud computing resource provisioning and management functionality; and
    providing a user interface to one or more users, wherein the user interface exposes functionality for semantic search of the dynamically updated catalog and knowledge base by the one or more users, and functionality for cloud computing resource provisioning and management.

2. The method of claim 1, further comprising learning dependencies of computing resources in accordance to workload templates among different resource providers.

3. The method of claim 2, further mapping to the catalog and the knowledge base the pieces of information which identify the different cloud computing resource providers, identify cloud computing resources and their access, and identify different types of workloads and tasks that can be performed using the different cloud computing resource providers.

4. The method of claim 1, further curating the knowledge base by learning dependencies among computing resources and configurations that constitute workload descriptors or task descriptors.

5. The method of claim 4, wherein curating includes learning to detect and derive rules for matching computing resources to queries for computing resources.

6. The method of claim 5, further capturing descriptors of types of computing resources, their attributes, and their taxonomy of values, dependencies among computing resources, workloads, and tasks.

7. The method of claim 1, further comprising semantic indexing of the catalog and the knowledge base.

8. The method of claim 7, further comprising matching and ranking of computing resources against textual and semi-structured queries.

9. The method of claim 8, further comprising logging of usage and deriving metrics of computing resources, computing resource providers, and consumers of computing resources.

10. A system for organizing cloud computing resources, comprising:
   resource cataloging hardware on which a catalog of different cloud computing resource providers and their cloud computing resources is stored;
   a knowledge base of types of cloud computing resources storing semantic descriptors of the types, their attributes including relations among cloud computing resources, taxonomy of their values, and actions that are configured to be performed based on the types and the capabilities of the cloud computing resource providers of the cloud computing resources, wherein the semantic descriptors are associated with numeric weights or qualitative rankings to assist in detection and scoring of the types; and
   user tools and backend hardware configured to dynamically update the catalog and the knowledge base to refresh pieces of information pertaining to the different cloud computing resource providers, semantic descriptors of cloud computing resources, types, their attributes, and the taxonomy of their values so as to inventory cloud computing resources that are available on-demand over the Internet,
   wherein the backend hardware provides an application programming interface for semantic search functionality for semantic search and discovery of the cloud computing resources and cloud computing resource provisioning and management functionality, and wherein the user tools include a user interface that exposes functionality for semantic search of the dynamically updated catalog and knowledge base by one or more users, and functionality for cloud computing resource provisioning and management.

11. The system of claim 10, further comprising resource matching and ranking hardware for processing a query to match it to one or more computing resources, which are ranked.

12. A computer-readable medium, which is non-transitory, on which computer-executable instructions are stored to implement a method for organizing cloud computing resources, comprising:
   creating a catalog of different cloud computing resource providers and their cloud computing resources that are available on-demand over the Internet;
   creating a knowledge base of types of cloud computing resources storing semantic descriptors of the types, their attributes including relations among cloud computing resources, a taxonomy of their values, and actions that are configured to be performed based on the types and the capabilities of the cloud computing resource providers of the cloud computing resources;
   associating the semantic descriptors with numeric weights or qualitative rankings to assist in detection and scoring of the types;
   dynamically updating the catalog and the knowledge base to refresh pieces of information pertaining to the different cloud computing resource providers, semantic descriptors of cloud computing resources, types, their attributes, and the taxonomy of their values so as to inventory cloud computing resources that are available on-demand over the Internet;
   providing an application programming interface for semantic search functionality for semantic search and discovery of the cloud computing resources and cloud computing resource provisioning and management functionality; and
   providing a user interface to one or more users, wherein the user interface exposes functionality for semantic search of the dynamically updated catalog and knowledge base by the one or more users, and functionality for cloud computing resource provisioning and management.

13. The computer-readable medium of claim 12, further comprising learning dependencies of computing resources in accordance to workload templates among different resource providers.

14. The computer-readable medium of claim 13, further mapping to the catalog and the knowledge base the pieces of information which identify the different cloud computing resource providers, identify cloud computing resources and their access, and identify different types of workloads and tasks that can be performed using the different cloud computing resource providers.

15. The method of claim 12, further curating the knowledge base by learning dependencies among computing resources and configurations that constitute workload descriptors or task descriptors.

16. The computer-readable medium of claim 15, wherein curating includes learning to detect and derive rules for matching computing resources to queries for computing resources.

17. The computer-readable medium of claim 16, further capturing descriptors of types of computing resources, their attributes, and their taxonomy of values, dependencies among computing resources, workloads, and tasks.

18. The computer-readable medium of claim 12, further comprising semantic indexing of the catalog and the knowledge base.

19. The computer-readable medium of claim 18, further comprising matching and ranking of computing resources against textual and semi-structured queries.

20. The computer-readable medium of claim 19, further comprising logging of usage and deriving metrics of computing resources, computing resource providers, and consumers of computing resources.

* * * * *